United States Patent
Riachi et al.

(10) Patent No.: US 12,307,220 B1
(45) Date of Patent: May 20, 2025

(54) AUTOMATING BEHAVIORS BASED ON ENTITY MODELING

(71) Applicant: Honu AI Limited, Altrincham (GB)

(72) Inventors: Imad Riachi, Altrincham (GB); John Simon Nolan, Straiton (GB)

(73) Assignee: Honu AI Limited, Altrincham (GB)

( * ) Notice: Subject to any disclaimer, the term of this patent is extended or adjusted under 35 U.S.C. 154(b) by 0 days.

(21) Appl. No.: 18/784,011

(22) Filed: Jul. 25, 2024

(30) Foreign Application Priority Data

May 15, 2024 (GB) .................................. 2406902

(51) Int. Cl.
  *G06F 8/20* (2018.01)
  *G06F 8/75* (2018.01)

(52) U.S. Cl.
  CPC . *G06F 8/24* (2013.01); *G06F 8/75* (2013.01)

(58) Field of Classification Search
  CPC ..... G06F 8/24; G06F 8/22; G06F 8/20; G06F 8/75
  See application file for complete search history.

(56) References Cited

U.S. PATENT DOCUMENTS

| | | | |
|---|---|---|---|
| 6,601,233 | B1 | 7/2003 | Underwood |
| 7,676,786 | B2 | 3/2010 | Shenfield et al. |
| 8,037,453 | B1 | 10/2011 | Zawadzki |
| 8,745,577 | B2 | 6/2014 | Reech et al. |
| 9,251,165 | B2 | 2/2016 | Reech et al. |
| 9,823,900 | B2 | 11/2017 | Ouali |
| 10,169,004 | B2 * | 1/2019 | Khoyi ................. G06F 3/04847 |
| 11,074,107 | B1 | 7/2021 | Nandakumar |
| 2013/0246996 | A1 * | 9/2013 | Duggal ..................... G06F 8/35 717/104 |
| 2014/0297694 | A1 | 10/2014 | Reech et al. |
| 2017/0132817 | A1 * | 5/2017 | Mahajan ................ G06N 3/105 |
| 2017/0322716 | A1 * | 11/2017 | Khoyi ....................... G06F 8/35 |
| 2018/0018415 | A1 * | 1/2018 | Pulfer ............... G06Q 10/0635 |
| 2018/0024814 | A1 | 1/2018 | Ouali |
| 2019/0319987 | A1 * | 10/2019 | Levy ...................... H04L 63/08 |
| 2023/0308460 | A1 * | 9/2023 | Thomas ............... H04L 63/102 |
| 2024/0267251 | A1 * | 8/2024 | Mishelevich ......... H04L 12/283 |

FOREIGN PATENT DOCUMENTS

| | | |
|---|---|---|
| CA | 2777443 C | 7/2020 |
| WO | 2008/147616 A1 | 12/2008 |
| WO | 2011/045634 A1 | 4/2011 |

* cited by examiner

*Primary Examiner* — Wei Y Zhen
*Assistant Examiner* — Amir Soltanzadeh
(74) *Attorney, Agent, or Firm* — Sunstein LLP

(57) ABSTRACT

The present disclosure relates to systems and methods for automating behaviors performed in relation to a modelled entity. An entity model comprising a plurality of artefacts is accessed, each artefact models a feature of a modelled entity. A first subset of artefacts in the entity model is matched with a predefined artefact structure. In response to matching the subset with the first artefact structure, a first behavior associated with the predefined artefact structure is identified. The first behavior is initiated and, based on the initiated first behavior, a new artefact is added to the entity model, or an existing artefact is removed from the entity model, or an existing artefact in the entity model is modified, resulting in an updated entity model.

18 Claims, 15 Drawing Sheets

AUTOMATING BEHAVIORS BASED ON ENTITY MODELING

FIELD

The present disclosure pertains to mechanisms for automating behaviors based on entity modeling.

BACKGROUND

Object-oriented approaches build collections of interconnected objects. Object oriented approaches have been used to model complex entities, such as complex and evolving real-world systems.

In object-oriented programming (OOP), an object has a fixed identity and can have a state and one or more methods. Properties, behaviors and relationships to other objects are conventionally defined in the state and method of the objects themselves. OOP is a computer programming model that organizes software design around object identity and behavior, rather than functions and data. In typical OOP contexts, objects defined as instances of classes, where the classes are linked with functional uses of the classes. Methods are typically predefined in the classes to determine how the objects interact with each other.

SUMMARY

In various aspects disclosed herein, an entity is modeled as a collection of artefacts. An explicit modeling approach is adopted, in which artefacts represent particular features of the entity. The model supports behavior binding, whereby the behavior is not defined by the type or identity of the artefact like in OOP systems, but by the pattern of artefact types and pre-conditions. Behavior binding in this sense enables autonomous agents to act based on the model. For example, in one implementation, the entity model serves as a communication model between multiple cooperating autonomous agents that are notified of changes to the entity model, and can propose actions to take in response. This is merely one example, and other forms of behavior automation may be supported.

Rather than binding behaviors in the artefacts themselves, behaviors are identified and instigated based on dynamic context matching. A dynamic context refers to a defined artefact structure-a specific pattern of relationships between defined artefact types along with possible conditions. An available behavior is identified by matching a subset of artefact(s) in the entity model a predefined artefact pattern associated with the behavior. This approach enables specialization and extension of entity models without having to alter artefact definitions. Hence, the dynamic context matching approach provided herein provides greater flexibility and extendibility of behavior based on entity modeling, leading to effective automation of actions within an entity being modelled.

According to a first aspect of the present disclosure there is provided a computer-implemented method of automating behaviors performed in relation to a modelled entity, comprising: accessing an entity model comprising a plurality of artefacts, each artefact modelling a feature of the modelled entity; matching a first subset of one or more artefacts in the entity model with a first predefined artefact structure; and in response to matching the first subset of one or more artefacts with the first predefined artefact structure: identifying a first behavior associated with the first predefined artefact structure, initiating the first behavior, and based on the initiated first behavior, adding a new artefact to the entity model, or removing an existing artefact from the entity model, or modifying an existing artefact in the entity model, resulting in an updated entity model.

In some examples, the method comprises matching a second subset of one or more artefacts in the updated entity model with a second predefined artefact structure; and in response to matching the second subset of one or more artefacts with the second predefined artefact structure: identifying a second behavior associated with the second predefined artefact structure, initiating the second behavior, and based on the initiated second behavior, adding a new artefact to the updated entity model, removing an existing artefact from the updated entity model, or modifying an existing artefact of the updated entity model, resulting in a second updated entity model.

In some examples, the first behavior comprises sending a message to an autonomous agent.

In some examples, the method comprises receiving from the autonomous agent a response indicating an action to be performed, the method comprising causing the action to be performed, the updated entity model reflecting the performed action.

In some examples, the method comprises, responsive to matching the first subset of one or more artefacts with the first predefined artefact structure, associating a context artefact with the subset of one or more artefacts of the entity model, wherein the behavior is identified based on the context artefact.

In some examples, the first behavior is defined in a runtime engine external to the context artefact, and is identified in the runtime engine based on a type assigned to the context artefact.

In some examples, the first predefined artefact structure is defined in a context class within a library, wherein the method comprises instantiating, responsive to matching the first subset of one or more artefacts in the entity model with the first predefined artefact structure, the context class, resulting in the context artefact, the context artefact containing a link to at least one artefact of the first subset of one or more artefacts.

In some examples, each artefact of the entity model is an instance of an artefact class.

In some examples, the method comprises identifying a plurality of available agent engagement behaviors based on the agent artefact in the entity model, wherein the message is sent to the autonomous agent responsive to an input selecting the first behavior from the plurality of available agent engagement behaviors.

In some examples the method comprises, in response to matching the second subset of artefacts with the second predefined artefact structure, associating a second context artefact with the second plurality of one or more artefacts, wherein the second behavior is identified based on the second context artefact.

In some examples, matching the first subset of artefacts in the entity model comprises identifying structural information of each artefact in the first subset of artefacts. Each artefact of the plurality of artefacts in the entity model may comprise structural information defining a feature of an entity being modelled, and defining a structural link between said artefact and one or more other artefact in the entity model.

In some examples, matching the first subset of one or more artefacts with the first predefined artefact structure is performed in response to a change in the entity model.

In some examples, matching the first subset of one or more artefacts with the first predefined artefact structure is performed in response to: a change in a library associated with the entity model, a new library being associated with the entity model, or an existing library being disassociated from the entity model.

In some examples, updating the entity model comprises adding a new artefact, wherein the new artefact contains a link to an existing artefact. The existing artefact may be retained in the updated entity model and may not contain any link to the new artefact.

In accordance with a second aspect of the present disclosure, there is provided a system comprising: one or more processor; and computer memory coupled to the one or more processor, and comprising computer executable code which, when executed by the one or more processors causes the one or more processor to: access an entity model comprising a plurality of artefacts, each artefact modelling a feature of the modelled entity; match a first subset of one or more artefacts in the entity model with a first predefined artefact structure; and in response to matching the first subset of one or more artefacts with the first predefined artefact structure: identify a first behavior associated with the first predefined artefact structure; initiate the first behavior, and based on the initiated first behavior, add a new artefact to the entity model, or remove an existing artefact from the entity model, or modify an existing artefact in the entity model, resulting in an updated entity model In some examples, the computer executable code, when executed by the one or more processors, further causes the one or more processor to: match a second subset of one or more artefacts in the updated entity model with a second predefined artefact structure; and in response to matching the second subset of one or more artefacts with the second predefined artefact structure: identify a second behavior associated with the second predefined artefact structure, initiate the second behavior, and based on the initiated second behavior, add a new artefact to the updated entity model, remove an existing artefact from the updated entity model, or modify an existing artefact of the updated entity model, resulting in a second updated entity model.

In some examples, the computer executable code, when executed by the one or more processors, further causes the one or more processor, responsive to matching the first subset of one or more artefacts with the first predefined artefact structure, to: associate a context artefact with the subset of one or more artefacts of the entity model, wherein the behavior is identified based on the context artefact.

In some examples, the first behavior is defined in a runtime engine external to the context artefact, and is identified in the runtime engine based on a type assigned to the context artefact.

In some examples, the first predefined artefact structure is defined in a context class within a library, and the computer executable code, when executed by the one or more processors, further causes the one or more processor to: responsive to matching the first subset of one or more artefacts in the entity model with the first predefined artefact structure, instantiate the context class, resulting in the context artefact, the context artefact containing a link to at least one artefact of the first subset of one or more artefacts.

In some examples, the computer executable code, when executed by the one or more processors, further causes the one or more processor to: in response to matching the second subset of artefacts with the second predefined artefact structure, associate a second context artefact with the second plurality of one or more artefacts, wherein the second behavior is identified based on the second context artefact.

In accordance with a third aspect of the present disclosure there is provided a non-transitory computer-readable medium comprising computer executable instructions which, when executed by one or more processor, cause the one or more processor to implement a method comprising: accessing an entity model comprising a plurality of artefacts, each artefact modelling a feature of the modelled entity; matching a first subset of one or more artefacts in the entity model with a first predefined artefact structure; and in response to matching the first subset of one or more artefacts with the first predefined artefact structure: identifying a first behavior associated with the first predefined artefact structure, initiating the first behavior, and based on the initiated first behavior, adding a new artefact to the entity model, or removing an existing artefact from the entity model, or modifying an existing artefact in the entity model, resulting in an updated entity model.

Further aspects relate to computer-readable instructions for programming a computer system to implement a method according to any embodiment of the first aspect.

Example embodiments will now be described in further detail.

BRIEF DESCRIPTION OF THE DRAWINGS

For a better understanding of the present disclosure, and to show how embodiments of the same may be carried into effect, reference is made by way of example only to the following figures in which.

DETAILED DESCRIPTION

Figure 1:
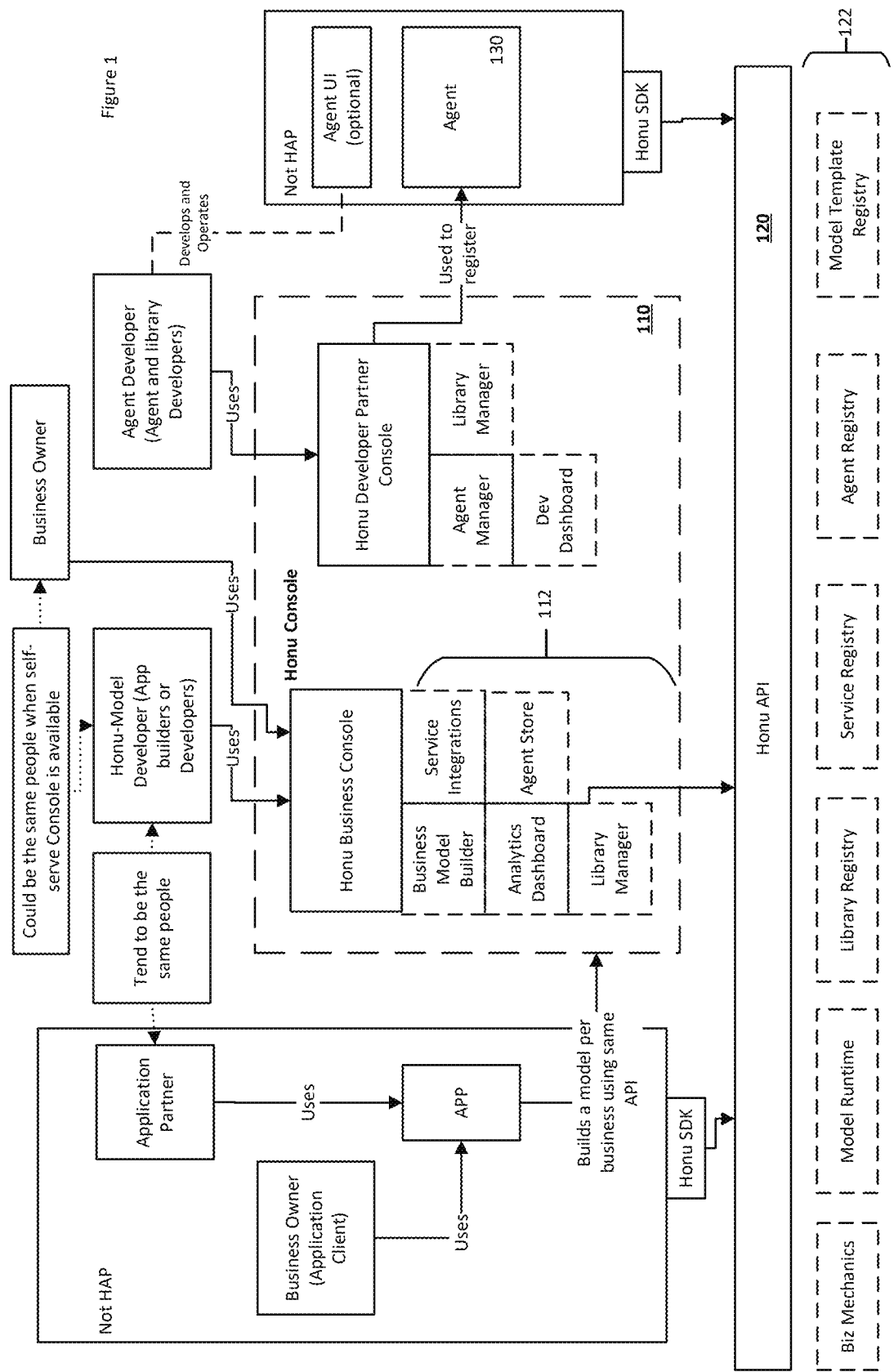
FIG. 1 shows an example system.

One challenge with conventional OOP techniques is that the objects are not sufficiently extensible in the context of automating decisions for an entity. That is, to extend the way objects interact with one another, the class structures may need to be redefined, or new sub-class structures may need to be defined. In the latter case, this may require reprogramming of the model to redefine existing objects as instances of the new sub-class type. Nevertheless, in both examples, recompilation is necessary to write the new mechanisms into the code.

The present application, by contrast, provides a technical framework that allows dynamic extension of behavior without requiring recompilation. Whereas typical OOP techniques would encode behaviors in objects structures, examples herein tie behaviors to contexts (e.g., structures of artefacts in an entity model). This enables runtime dynamism, in the sense that behaviors of an entity being modelled are not limited to those encoded in (for example) objects of a typical OOP-based model. Behaviors and contexts in which those behaviors emerge are defined separately from the structural part of the model, such that new behaviors and contexts can be introduced at runtime.

Behavior automation in the present context refers to a process of dynamically associating behaviors with evolving entity models to enable such behaviors to be implemented when appropriate (automatically in response to human input or entirely autonomously).

In the described examples, an OOP approach is used, in which artefacts of an entity model are realized as instances of artefact classes. In contrast to a more conventional OOP approach, behaviors are not defined in the object classes themselves, and are instead defined externally and implemented based on dynamic context matching. In certain specific examples, the Python syntax is used to define artefact classes. However, the techniques are not limited in this respect. Alternative approaches may be used, such as OOP-approaches based on different syntaxes (including bespoke syntax). Non-OOP approaches could also be used, for example with an entity model realized as a graph database.

In one example implementation scenario, a distributed architecture comprises a central system, one or more external autonomous agents, and one or more external services. In this scenario, dynamic context matching is used (among other things) to coordinate interactions with external agent(s) or to facilitate cooperation between multiple external agents. For example, in one approach, dynamic context matching is used to identify agent engagement(s) that are available given a current state of the entity model.

The central system interfaces with the external autonomous agents and the external services, e.g. via suitable interfaces such as programmatic interfaces or APIs. The central system stores a shared entity model which can serve as a communication model between the multiple external agents, enabling the agents to collaboratively solve problems, formulate strategies/plans, and then issue actions via the central system to external services. Inputs from external agents may be passed to the external services. Actions may originate externally to the central system. An agent may identify an action and cause a modification to the model. Based on the updated context (in view of the modification to the model), the runtime engine may inspect the context, and notify agents of the updated context such that the agent may undertake actions as part of their role.

As actions are performed, the entity model is updated, which in turn may reveal new options for agent engagement. Thus, as the entity model is updated as actions are performed, new options for agent engagements become available, leading to further actions.

One example application is process automation in an organization based on an explicit model of the organization.

A library may define possible artefact types and possible agent engagements. The library contains applicability rules, which determine when each agent engagement is available. An agent engagement becomes available when a particular type of artefact or combination of artefacts is present in the entity model. The entity model may additionally include connections (links) between artefacts representing relationships between them, and the applicability rules may depend on the artefacts and links that are present (e.g., a certain agent engagement may become available when a specific set of artefacts are connected in specific way). A set of artefacts and links therebetween, and agents engaged to perform roles defined by artefacts, and the states defined in a library may together be referred to as a 'context'. The library may define contexts (states of artefacts and links/relationships) wherein a role becomes relevant, and an agent may be notified to undertake their role when such a context is identified in the model (e.g., through model inspection by the runtime engine).

This architecture means the library (or libraries) in the central system can be scaled in anticipation of future agent capabilities. New automation functionalities emerge dynamically as new contexts become available and/or new external agents become available, opening up new agent engagement possibilities, causing the model to grow as actions are performed. Further, no reconfiguration of structures in the model needs to take place to introduce new capabilities, as behaviors are tied to structures of artefacts in the model rather than being defined in the artefacts themselves.

The library may associate roles with contexts before agents that can fulfil those roles become available. New agent engagements may subsequently become available when an external agent registers itself for a role defined in the library that was not previously available.

One of the challenges of automating entities is that entities in a given problem domain (e.g., businesses in a particular sector) appear to have similar structures but in reality the model of any particular business will be extremely specific depending upon the lifecycle phase they are in and the myriad choices of suppliers, vendors, services, practices, etc. This leads to a need to have highly customizable entity models which share as much commonality as possible such that expert agents can apply their analytical skills to specific sub-models of the business and work collaboratively with other agents towards high-level objectives. Furthermore, this demands the ability to specialize models on a per-case basis and extend the available features.

Examples herein further enable extensions and improvements contributed by third party experts to be incorporated into the platform, thus providing an adaptable technical framework for automating entities of various forms, sizes, and in various problem domains.

Examples described herein enable context-informed decision making and enable real-world actions to be performed by and on behalf of an entity. Any number of different actions may be automated, so long as an external agent configured to perform the action is available to be engaged by the central system. Advantageously, the examples herein enable automation of processes in a technical system, and the processes in the technical system are configured to cause real-world outputs and actions to be carried out.

Tools and systems described herein enable process automation based on an explicit model of an entity. In the described embodiments, a central system may be referred to as a 'Honu' platform or simply as Honu.

Developments in artificial intelligence (AI), including recent developments in generative AI, have enabled automation across many sectors. However, the inventors have noted that automating higher level structures such as entities like entire organizations may not be effective by merely automating aspects and processes of the organization separately in a disjointed fashion. The description herein provides examples of tools and techniques for modeling parts of an organization, including links therebetween, in order to automate processes in view of a wider context of all components in the entity.

Figure 5A:
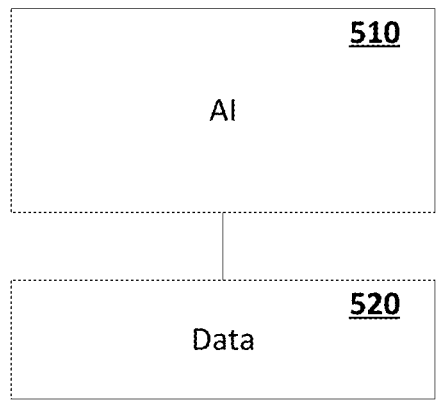
FIG. 5A shows an example AI system.
Figure 5B:
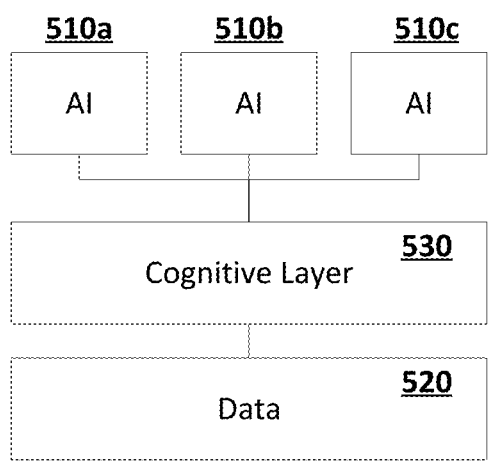
FIG. 5B shows an example AI system including a cognitive layer.

With reference to FIGS. 5a and 5b, the inventors have noted that systems wherein large AI tools 510 are in direct communication with data 520 to make decision (as in FIG. 5a) may not be as effective as systems using 'smaller' AI components (e.g., 510a, 510b, 510c) implementing separate functionalities. The AI components 510a-c may access and leverage data based on a model and in view of a context provided by a cognitive layer 530. Note that a 'small' AI component could be a large model, such as a large language model (LLM), but assigned a targeted role, task etc.

The cognitive layer 530 may act like a nervous system for the entity being modeled, equipping AI agents with the ability to understand context of the roles/actions they are performing.

As discussed later herein, agents may be engaged to perform a role, where that role is defined as an artefact in a model of the entity. The techniques described herein provide a technical framework for modelling an entity, and for enabling agents to perform their roles based on the model.

In some examples, agents may automatically take on certain tasks as part of the roles they have been engaged to perform. The techniques described herein provide a technical framework for modelling an entity, including features thereof and links therebetween, and for enabling agents to perform their roles based on the model.

A model of an entity such as a business may be built from libraries from a specific domain. Agents may dock onto the model, interacting with the business and other agents as well as one or more external service. Libraries may refer to specific packages of stylized program code such as python code. Libraries define artefact classes which are used in creating entity models.

The models described herein are dynamic and may update based on changes to the entity. Further, the model may update based on contexts identified within the model (e.g., particular structures of artefacts), and changes to the entity in the real world may be effected based on the change to the model, e.g., via an external agent instructed by the central system to act on behalf of the entity. Dynamic context matching processes are described in more detail later herein.

Figure 6:
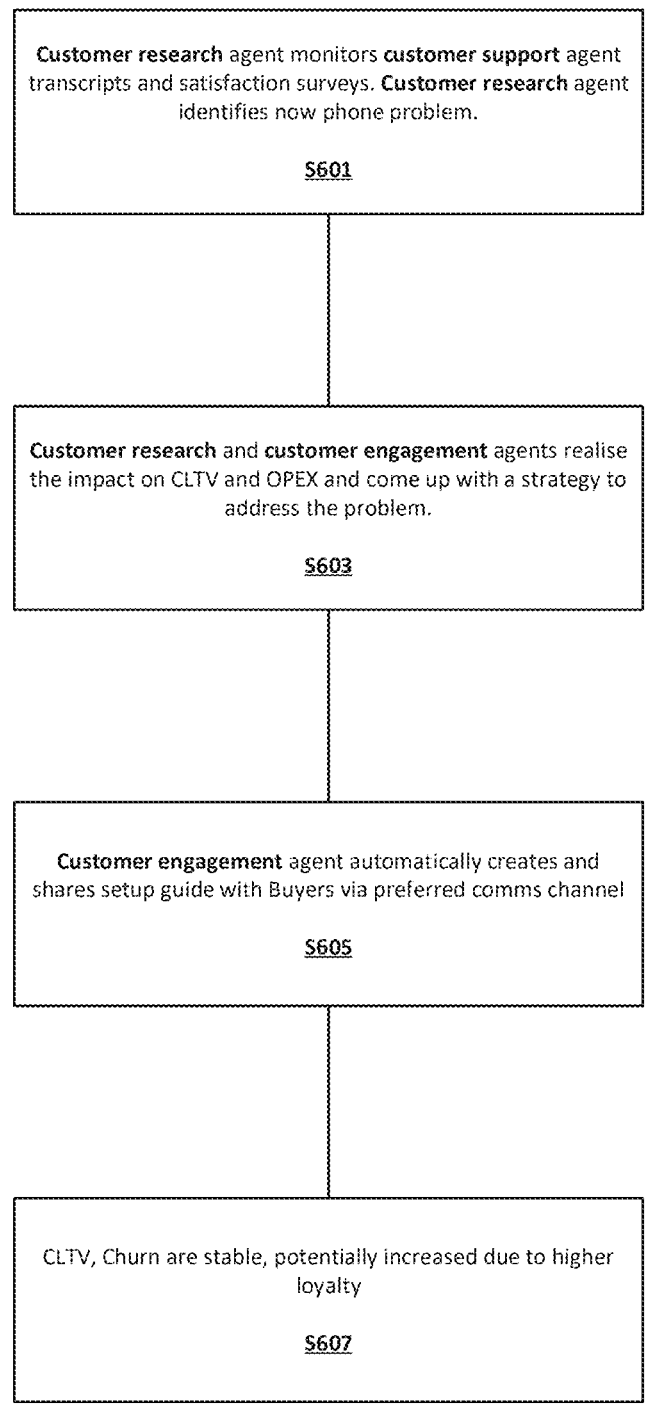
FIG. 6 shows a flowchart of an example sequence of agent actions, taken based on a model context.

The diagram of FIG. 6 represents an example emergent automated process, which may be automated based on the modelling and agent engagement techniques discussed herein. The emergent process may not be explicitly defined in the libraries or code. However, the dynamic matching of contexts and expertise produces a behavior, which post-hoc in isolation, may be described as a process. Moreover, techniques described herein generate an automated process by building and layering contexts for an entity, and enabling agents to communicate and act using the model. The automated process is not defined explicitly, but arises based on the context. FIG. 6 is described in more detail later. Examples of systems and techniques for implementing dynamic context matching are also provided later herein.

FIG. 1 shows components of a system for configuring a model of an entity and for engaging agents to take actions based on the model.

A central console 110 provides an interface to a platform for building models of entities. In some examples, organizations and businesses associated with the entities may be modeled. The console 110 may be an application developed to configure models of entities such as businesses, and to see metrics and run simulations based on the model. The model acts as a digital twin of the entity being modelled. The components denoted by reference numerals 110, 120, and 122 together comprise the platform.

In the example of FIG. 1, the central console enables a business owner to access user interface (UI) application components 112 providing functionalities for building a model, activating integrations with external services, performing analytics and simulations based on the model, accessing a store of registered agents, and accessing libraries of components for inclusion in the model, and monitoring installs, usage, billing and other metrics of a given agent. The explicit components of a model may be referred to as artefacts.

A second example set of UI application components is shown in FIG. 1, representing similar tools but external agent providers to develop tools for implementing roles that may be modelled. The developer console may be an application developed to allow developer partners to manage and monitor agents that they configure. Developer partners may be freelancers or software providers. The developer partners may make their services available or monetize expertise in the form of an agent on the platform.

The interface for building models may comprise no-code interfaces, such as graphical tooling, guided interfaces etc.

An agent UI may be configured to provide an alternative interface to the agent itself.

Business owner accessing the business console and associated UI tools 112 may configure the model through a developer, or may act themselves to build a model. A business owner in context of FIG. 1 may be someone who owns or is acting on behalf of a business.

The console 110 operates through an application programming interface (API) 120 to communicate with internal platform services 122 including, for example, model runtime, library registry, service registry, agent registry, business mechanics tools, and a model template registry.

Model runtime may refer to a sandboxed environment wherein a model is run. The model may be run locally on the platform infrastructure, where the platform makes calls to engaged agents and receives action invocations proposing actions to take (i.e., roles to fulfil).

The library registry refers to a catalog of available libraries which may be imported for use in constructing a model. The library registry may provide an API to register and unregister libraries.

The agent registry refers to a catalogue of available agents which may be engaged to fulfil roles that are encoded in a model. The agent registry may provide an API to register and unregister agents. Agents may register roles via the system. After an agent registers a role, an option to engage that particular agent to perform the role for which it is registered may be provided when building an entity model, provided the model has a context in which that role is relevant.

The service registry refers to a catalogue of available services which may be encoded as artefacts in a model and leveraged by agents that are engaged to fulfil roles via the service. The service registry may provide an API to register and unregister services.

Business mechanics refers to a representation of the relationships amongst different model artefacts. These objects may be used to run simulations and for forecasting.

The model template registry may be a catalogue of available template models, which may be added to a model to quickly build larger and more complex models. The model template registry may provide an API to register and unregister templates.

The following description provides definitions of terms that may be referred to herein.

A domain may refer to a collection of models that share a common set of libraries.

A model will be understood as a representation of an entity such as a business or organization. The model represents relationships between components and elements of the entity. A model may exist within a domain using artefacts declared in the libraries which may be instantiated at runtime.

An artefact is an instance of a class which is implemented in the model to represent an aspect of the entity. A particular artefact may be a unique combination of the type and values of its fields.

A library is a package of definitions of artefact types, such as agents, services, data sources, and domain artefacts. Partner developers may build libraries, while model developers may use these built libraries to construct models.

Services as referred to herein may be APIs to an external application which may be used within a model. There is a decorator which defines a service within a library. Services may provide actions that can be performed.

The term 'service interface' may refer to an API to an external application which may be implemented by a service. This may create an abstraction between an action and the implementation.

Agents may be software that take on roles, or implement actions. Agents may act via services to effect the role using user credentials for which the user has granted permissions. An agent may undertake their role by automatically performing one or more task. Libraries may not define tasks that an agent is to perform in order to undertake their role. Libraries may define roles, and agents configured to undertake those roles may not be constrained to a particular methodology or predefined set of tasks within that role.

Templates refer to blueprints of a domain or model. Using a template may speed up the configuration and definition of a model.

An SDK is a collection of code and utilities used to facilitate building models using the platform 110. SDKs may operate using particular programming languages, e.g., python.

The term simulation may refer to the application of values to a subset of the elements of a business mechanic, in order to get the values for other elements via relationships defined in the mechanic.

Figure 2:
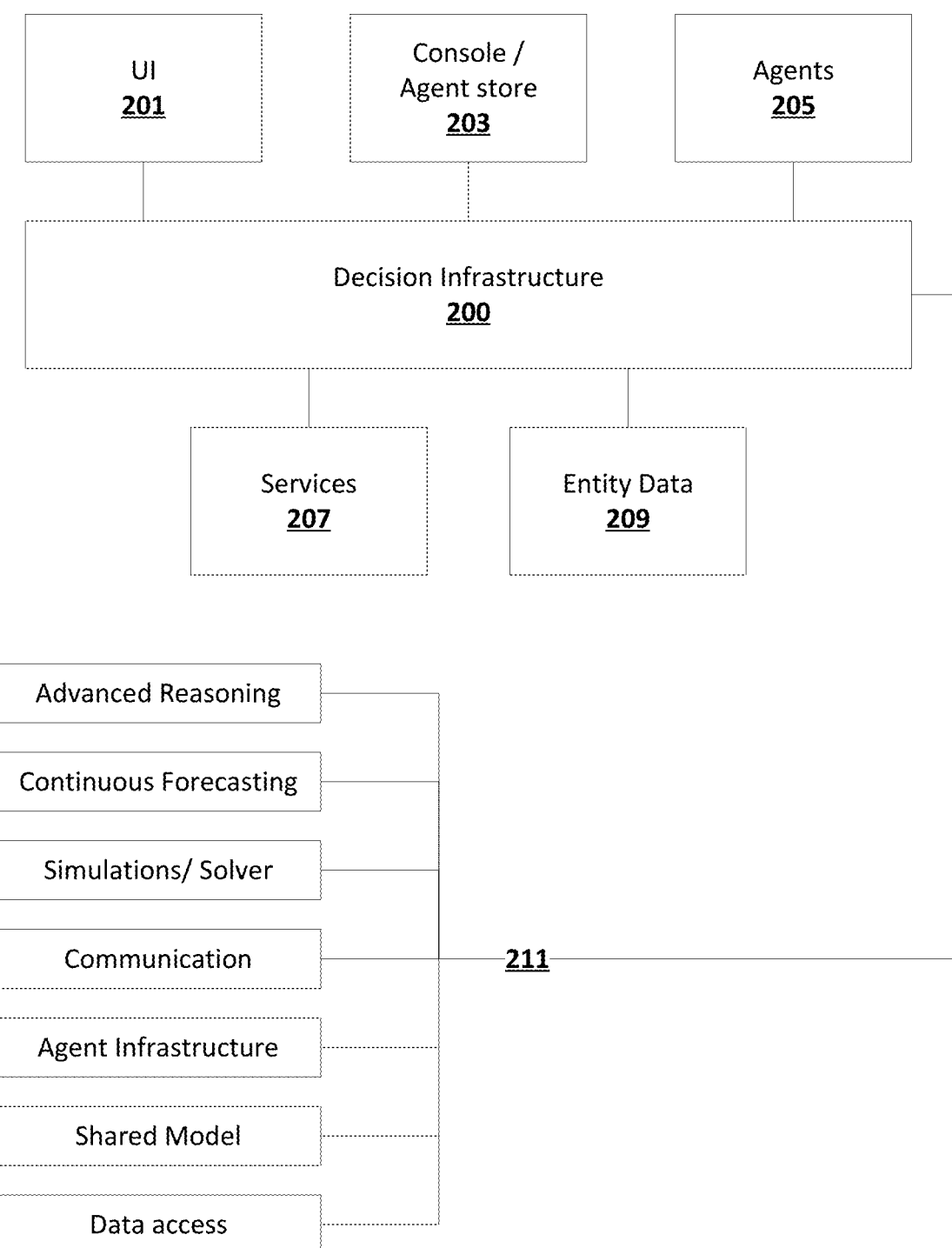
FIG. 2 shows an example decision infrastructure.

FIG. 2 shows an example of a system comprising a decision infrastructure 200 and connected components configured for identifying and implementing actions autonomously based on a digital twin model of an entity.

The system comprises a user interface component 201, e.g., for viewing and managing a model of an entity. A console 203 is provided, and may provide repositories for agents. Agents 205 may connect to the decision infrastructure 200 to access models in which they have been engaged to perform a role. The agents may access user credentials to perform their role using those user credentials. Services 207 also connect to the decision infrastructure for providing functionality. The agents 205 and services 207 may need to be registered at the console 203 before being implemented and engaged by the model. The agents 205 may perform their respective roles by accessing services 205 using the user credentials.

Entity data, e.g. business data, 209 is also accessible via the decision infrastructure.

The decision infrastructure 200 may comprise tools 211, such as advanced reasoning tools which may leverage AI or large language models (LLM), continuous forecasting, simulations and problem solving tools, communication functionalities, agent infrastructures for interfacing with agents, the shared model of an entity which is accessible to partners, services and agents, and data access tools.

Figure 3:
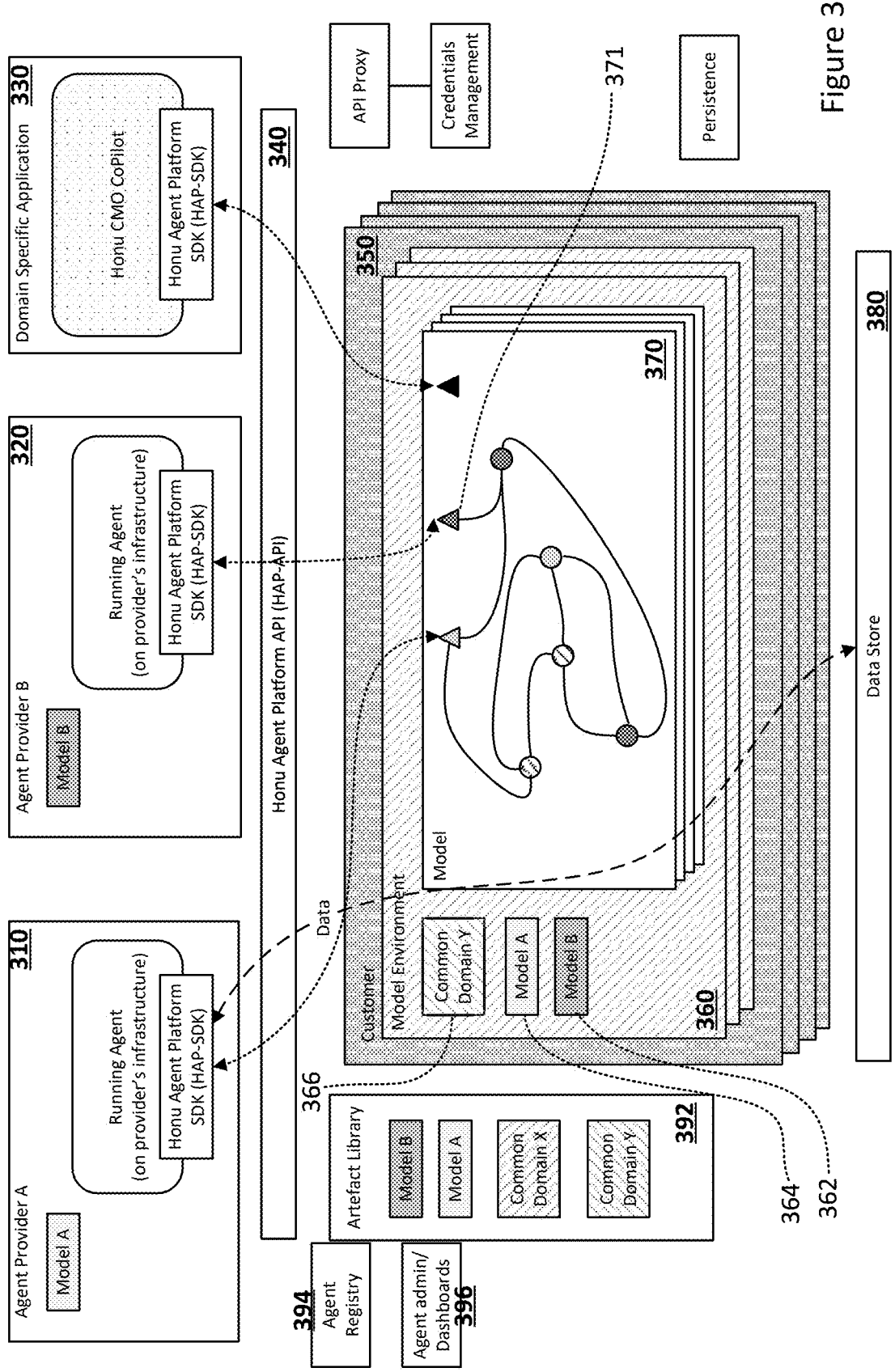
FIG. 3 shows a block diagram representing model-building techniques.

FIG. 3 shows a schematic diagram of an example sandbox environment and agent providers connecting to the environment.

FIG. 3 shows a block 310 representing a first agent provider, provider A.

FIG. 3 also shows a block 320 representing a second agent provider, provider B. each agent provider 310, 320 runs an agent on their own infrastructure.

The agents communicate via a platform API 340 for the platform providing the sandbox environment.

FIG. 3 also shows a domain specific application 330 accessing the platform via the API 340.

A customer-specific UI sandbox environment is represented by block 350. A plurality of blocks 350 are shown overlapping each other to represent that the platform supports plural customers. The customer environment 350 comprises a model environment 360 for constructing a model 370 of an entity. Example artefacts are represented by interlinked circles and triangles within the model 370. The triangles in the model 370 represent roles. Agents may be engaged to fulfil a role, as indicated by the connection between agent provider B 320 and a first triangle 371 representing a role, via API 340. Similarly, agent provider A is shown to be linked via the API 340 to a second triangle, and the domain specific application is linked via the API 340 to a third role/action artefact in the model 370.

The platform is associated with an artefact library 392 which provides available artefacts based on a current state of the model. The available artefacts may be provided based on inspection by the runtime engine of a loaded library.

FIG. 3 further shows an agent registry 394 comprising agents which have been registered, and an agent admin dashboard 396.

Reference numeral 380 denotes a data store which may be accessible via the API 340 to an agent provider (e.g., 310) to assist in performing the role the agent has been engaged to perform.

An example model builder user interface is described with reference to FIG. 1. On entering the model builder, libraries may be installed. A library may contain a plurality of template artefacts (e.g. artefact classes in the OOP sense) and predefined links between artefacts. On installing a library, a set of available artefacts is provided via a user interface (UI). A user may insert an artefact into the model based on the set of available artefacts.

A runtime engine may be configured to load libraries and to interpret the libraries to identify the set of available artefacts. That is, the runtime engine may inspect a library to assess which artefacts are suitable for inserting into the model, and may provide the set of available artefacts on the UI for inserting into a model.

A model of an entity may be built using one or more available artefacts and by linking artefacts. The underlying runtime engine may reason about connections between artefacts based on the installed library. The runtime engine inspects the libraries that are installed and the current state of the model to offer further available artefacts which may be linked to existing artefacts. Dynamic context matching techniques described later herein provide the technical framework enabling the runtime engine to identify contexts, update the model, and instruct external agents to act on behalf of the entity.

The user interface may provide a sandbox environment supported by the runtime engine. A model may be created within the user interface by a user, by selecting available artefacts and implementing the artefact in the model.

In one example, the user may initially create an organization artefact representing a real-world organization. The organization artefact is an instance of a type of data structure, including metadata. The organization artefact may represent a first artefact in the model. By including an organization artefact in the model, the runtime engine may identify a set of further artefacts which are available in view of the model having an organization, and in view of the links defined in the library.

In another example, the library may provide a predefined template for an entity. The template model may comprise a plurality of artefacts and links therebetween to represent respective components and links of a real-world entity.

The entity being modelled may be a business linked to an organization. The model may represent the organization as a first artefact and represent the business as a second artefact. The business may be linked to the organization by a first type of link, e.g., a 'business_of' link indicating that the business is a business of the organization.

Artefacts may also be added to represent real-world activities of the business, real-world metrics, real world budgets, objectives and other aspects of the entity. The model may include respective links between these artefacts to indicate their real-world association with the business.

The metric artefacts may represent information that is important to the business. Examples include revenue and profitability.

Objective artefacts may be linked to a metric artefact to indicate a goal or aim in respect of the associated metric. For example, a target revenue may be represented as an objective artefact linked to the metric artefact, where the metric artefact is then linked to the business artefact.

Real-world operations of the business may also be represented by artefacts in the model. For example, the business may engage in online retail or eCommerce activities. An artefact may be included in the model to represent the real-world eCommerce operation, and linked to the business within the model.

The eCommerce operations of the business may include one or more channel, e.g., an online blog and an online shop. Each channel may be represented by a respective artefact and linked to the business. The blog channel may be connected in the model to a blog artefact representing the blog itself. Metric artefacts for performance of the blog, such as viewing figures and reach etc. may be configured in the model. Objective artefacts for the blog metrics may be configured too, defining objectives related to the measurements made in respect of the blog.

For the online shop channel, a shop artefact may be configured in the model to represent the shop, with one or more related metric artefact and objective artefact representing the real-world metrics by which the shop channel performance is measured, and defining goals for the metrics.

Fundamentally, the model represents a digital twin of a business or other entity. In the example of modelling a business, artefacts may be included in the model to represent various aspects of the business, business goals, and revenue channels, and to represent real world metrics for each aspect including target/objective for the metrics. Business mechanics/physics may also be encoded as artefacts in a model. Parts of a business such as operations, finance, marketing, or other departments may add artefacts representing business mechanics. The examples herein are not limited to revenue generation.

Other examples of channels, metrics and objectives than those discussed above may be configured. The principles above also extend to other sectors and problem domains than eCommerce.

The model may further include artefacts that define a role within the business. That is, an artefact may represent a role for taking an action within the business. In one example, an artefact representing a role of generating blog posts may be included in the model and associated with the blog artefact. As discussed above, a role artefact may be provided within the set of available artefacts in the UI based on the runtime engine's interpretation of the library, where the library defines role artefacts and identifies the association of particular roles with particular artefacts. For example, the blog generation artefact may be provided within a set of available artefacts based on inclusion of a blog artefact within the model, and based on the structure of the library.

An agent configured to perform a role may be engaged via the model. At runtime, an agent may take real-world actions on behalf of the business based on the digital twin model of the business. However, agents themselves and the code they run may not be defined in the library. Agents may be third party agents suitable for implementing a particular role/action. Ability to perform an action in certain contexts of artefacts in the model, i.e., the interface of the roles and artefacts, are defined in the library.

Third party agents may offer practical delivery of a role defined in a library. The user interface may enable a user to select an agent and engage that agent to perform a role defined in the model.

In some examples, a plurality of agents may be able to provide a same role. The role is represented in the model, and a user may arbitrarily select one of the available agents to engage, for that agent to practically deliver the associated role.

An agent may act on behalf of the business by performing a role it was engaged to undertake. The model may act as a smart ecosystem. Examples herein make the ecosystem (as the business) intelligible for the AI agents so that they can interpret the given service in relation to the common business model, and have the capability, when possible, to even estimate and measure the impact of that service on a business metric or objective.

The model building tool may be hosted on a platform with which organizations register to build models. One or more libraries may also be registered with the platform. Registered libraries may then be available for loading in the runtime engine to allow models to be constructed based on the library.

Services may also be registered with the platform to provide functionality. For example analytics services and links to web services may be registered enabling those services to be represented in the model. Services are available to make real-world decisions and take real-world actions. That is, agents may operate through a service to perform their associated role. In one example, a blog-posting agent configured to upload content to a blog may be engaged to satisfy a role, where that role is encoded as an artefact within the model. The agent may act through a registered service to deliver its role in the real-world—i.e., posting real-world blog content.

Agents are also registered with the platform. Registered agents may then be selected in the model building tool and linked to an associated role to enable actions associated with the role to be delivered by that agent at runtime. Multiple agents may be registered in respect of a single role, and a user, when engaging an agent to fulfil a role in their model, may select from a set of suitable agents.

Similarly, a single registered agent may be capable of fulfilling a plurality of roles. In such cases, a same agent may be recommended as a suitable agent in respect of a plurality of different roles within the model. The user may select to engage the same agent for multiple different roles, where those roles are represented by distinct artefacts in the model.

Agents may operate using credentials of the user. The model may comprise user credentials for a service. An agent seeking to deliver its assigned role through a service may interface with the model to retrieve credentials of the user, and then the service may be engaged by the agent using the retrieved credentials.

Permissions may be required to allow an agent to access user credentials via the model. However, the user may provide permission to the platform, not each agent individually. This allows a single grant of permission to enable multiple registered agents to interface with the platform and model to retrieve and use the user credentials when delivering their role.

An agent may operate proxy to the decision infrastructure or may operate directly with the service. However, the user does not grant permission to individual agents. The user grants permission to the platform hosting the model building tool, and any registered agent that is engaged to fulfil a role is able to access the user credentials based on the permission granted to the platform.

One of the challenges of implementing agents to work with services belonging to third-parties is credentials management. Current service authentication techniques have evolved from the principle of a client providing access directly to an application/service to retrieve user data or invoke actions. In the situation of having multiple external agents hosted remotely and separately interacting with services, known techniques may require users to provide credentials to every agent, every time the agent wants to gain access or use a service. This quickly becomes a problem, as most users may not have the organizational permissions to do this, or the knowledge how to do it, let alone manage the geometrically increasing number of credentials issued.

The present system may contain a mechanism whereby an organization can define the credentials once for a given service, which can then be used by agents via the service-type artefact instances defined in the model. These are instantiated via the appropriate pre-configured credentials. This way, one organizational administrator can configure the credentials, but many actants can use them (without direct access) and external agents can use instantiated services.

To facilitate this, the system offers an API proxying service which injects the credentials into service calls, without revealing the credentials to the external agent. Furthermore, this offers the opportunity to add model-specific limitations over and above the access security of the service itself. For example, whilst the service might give access to all the data the API proxy might be configured to filter out PII (personally identifiable information) data.

The platform represents a meeting point and mediator between external agents, available services, and organizations using the modelling tool.

The platform (e.g., the decision infrastructure) that hosts the model building tool acts as a wrapper or interface between the agents, models and services.

More generally, a service may be understood as a function which can be interrogated via an API. For example, external analytics services, services, and internal company data may all be accessible and interrogable via an API and may therefore be registered as a service. An agent may then be engaged to leverage the service to act on behalf of the entity being modelled.

Roles such as blog posting are defined as an interface in a library. Corresponding services are configured to implement that interface, and agents are engaged to operate that interface and perform the role through the service based on the role defined in the library.

During model building, an initial model may be constructed with various artefacts and links therebetween, including artefacts representing roles. Agents may then be engaged to fulfil roles, e.g., via services.

In some examples, engaged agents may recommend actions that they can take to fulfil their role. Recommended actions may be implemented within the model as temporary artefacts representing outputs of the action. The temporary artefacts may be visible to other agents providing different actions, who may in turn provide temporary artefacts identifying actions that may be taken based on the model and other temporary artefacts.

Agents may undertake one or more task autonomously as they undertake the role they are engaged for. For example, an agent configured to undertake a role of writing and posting blog articles may automatically undertake the tasks of identifying an article theme, generating content, formatting the content, and otherwise preparing the article for posting. A temporary artefact may be surfaced in the model indicating that an article is available to post. A user may be able to accept or reject the recommendation to post an article. In other examples, the agent may autonomously post the article and may instantiate an artefact in the model, representing the article within the blog.

Whilst building a model, artefacts and links may be used to accurately recreate the current state of the entity being modelled. When agents are engaged and the model is live, i.e., at runtime, agents may perform their role to produce outputs, and automatically cause a new artefact to be included in the model to represent the output.

Temporary artefacts may be understood as agent proposal artefacts which may be accepted by a user to add that artefact to the model. An agent may propose to include a new artefact in the model because a particular combination of artefacts with certain properties exists in the model, and the agent recognizes that its role is available when that particular combination of artefacts is present.

The models described herein may be seen as dynamic models since artefacts may be added or removed in view of actions undertaken by agents.

Situations where an artefact can be added to the model based on other artefacts and roles in the model may be captured as rules in a state machine. States in the state machine are associated with respective available agent engagements and transitions between states are defined by the entity model. An update to the model may cause a transition in the state machine, which in turn causes a new set of agent engagements (associated with the new state) to become available.

A model may further encode mechanics of the entity. For example, relationships between metrics may be encoded in the model, based on real-world metrics and real-world relationships between those metrics. Metrics are represented as metric artefacts, with dependencies defined by mathematical equations, analogous to a physics model.

An entity model provides the possibility to simulate the entity and enables forecasting based on the digital twin of the entity.

As discussed above, the models are supported by an execution or runtime engine which can implement a library to build models of an entity. The runtime engine inspects what is available within the library based on the current form of the model and provides a set of available artefacts and roles etc. The runtime engine acts to observe the state of the machine and the available libraries that have been imported and provides the set of possible actions.

As the state of the model changes, as artefacts are added or removed, the set of available actions is also updated based on inspection of the libraries and the model by the runtime engine.

Figure 4:
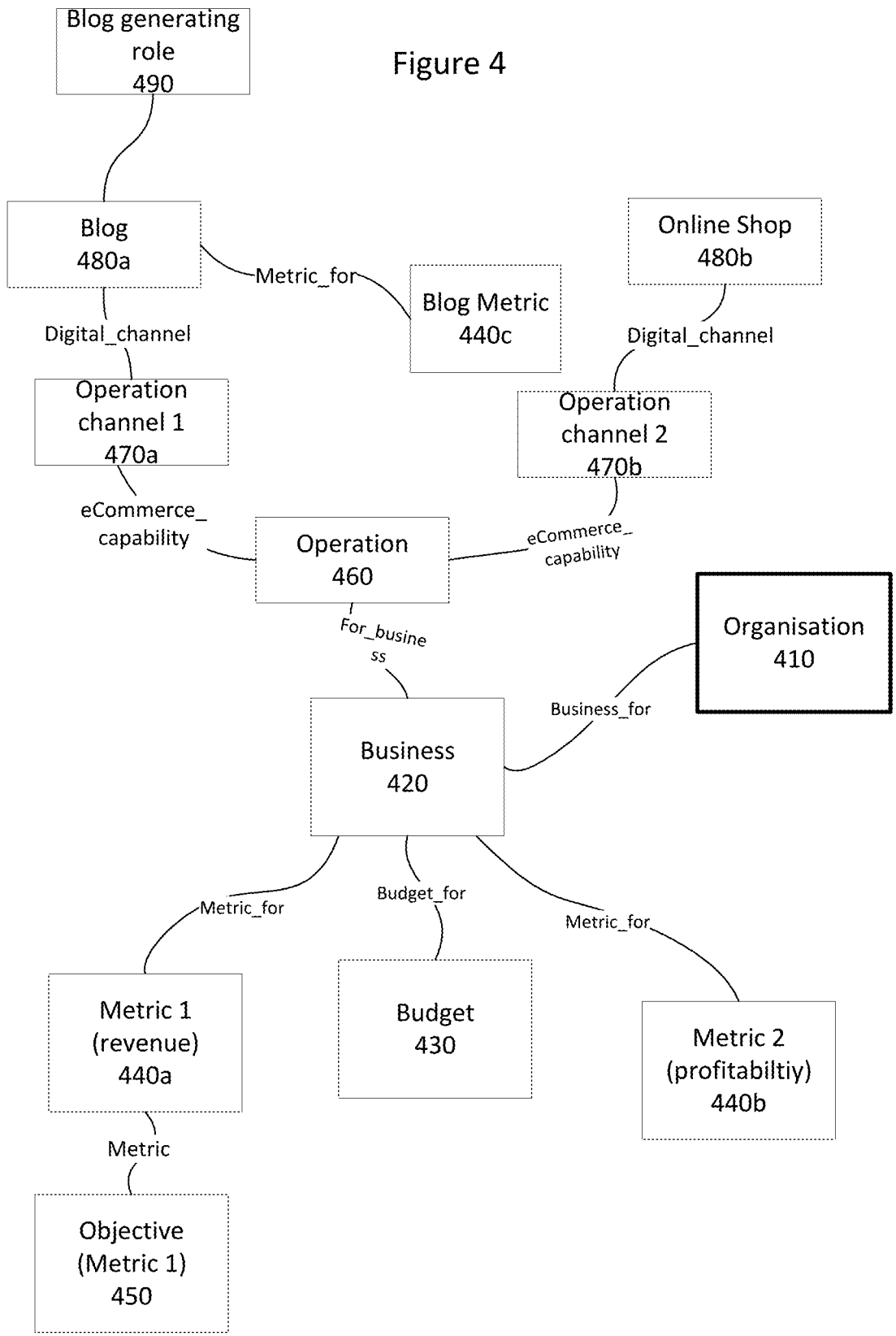
FIG. 4 shows a block diagram of an example model.

Reference is made to FIG. 4, which shows an example representation of a model, including artefacts representing an organization 410, and an associated business 420. The model further includes a budget artefact 430 representing a budget of the business, and two metrics of the business 440*a*, 440*b*. The first metric 440*a* is associated with an objective artefact 450 defining an objective in respect of the first metric 440*a*.

The second metric artefact 440*b* represents a profitability of the business.

The business artefact is also linked to an operation artefact 460 which represents an operation, e.g., sector of operation of the business. Two channel artefacts 470*a* and 470*b* respectively represent channels of operation of the business. The first channel artefact 470*a* represents a blog channel, and the second channel artefact 470*b* represents an online shop.

The blog and online shop are represented by respective artefacts 480*a* and 480*b*.

The blog artefact 480*a* is associated with a blog metric artefact 440*c* which is a metric artefact associated with the blog. The metric may relate, for example, to blog engagement etc.

A blog generating role is also represented by artefact 490. The blog generating role represents actions that may be taken by an agent to perform a role such as generating content for a blog and, for example, posting that content on the blog.

An agent may be engaged to perform the role represented by the role artefact 490, as discussed above.

The artefacts in FIG. 4 are linked together to indicate their interdependence and association with one another.

Figure 7A:
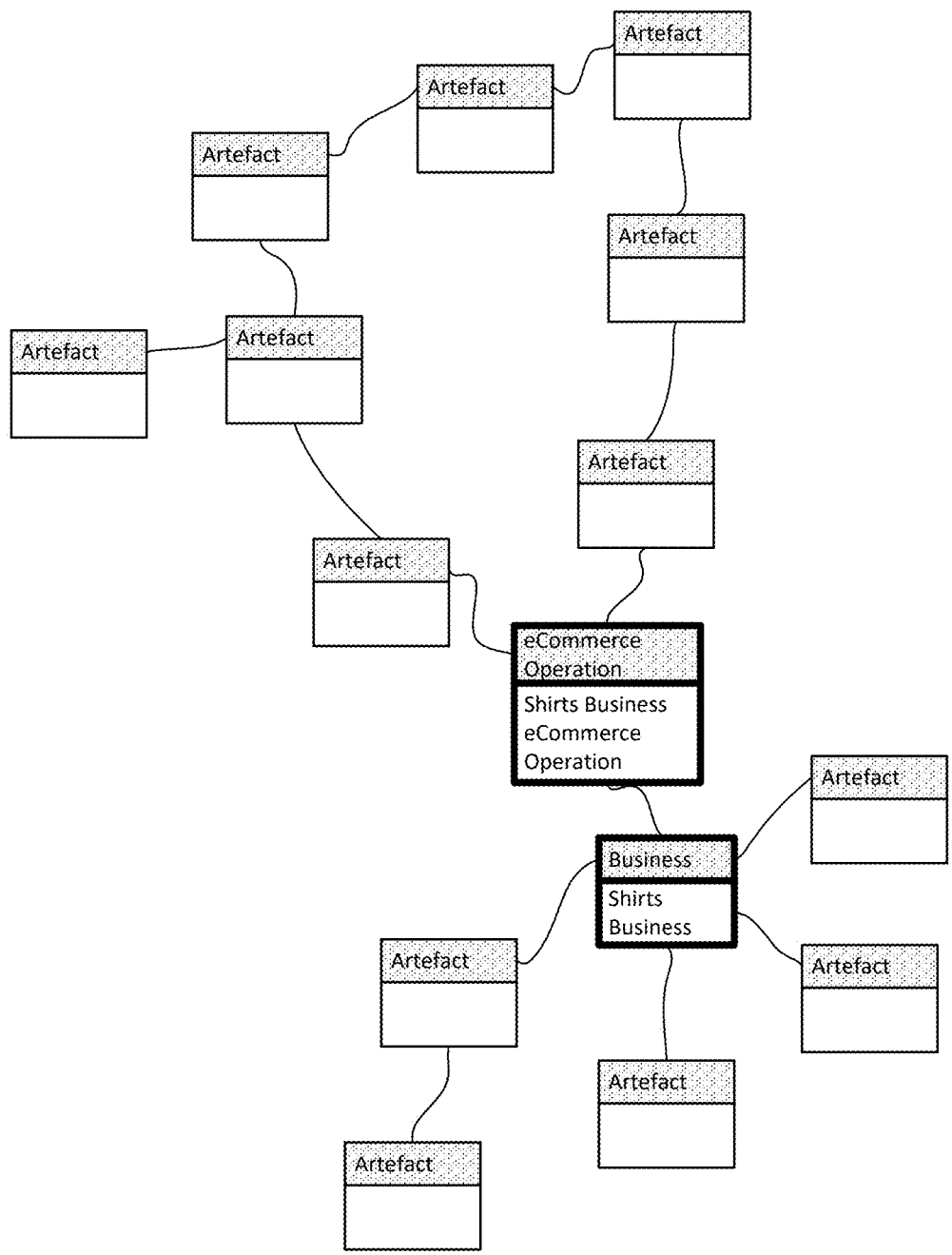
FIG. 7a shows an example structure of an initial entity model.

The description that follows provides, with reference to FIGS. 7*a*-7 an example flow in which an initial model is updated automatically when an agent engaged to perform a role initiates a recommended action.

The flow begins with an initial set of artefacts, and links between artefacts. The initial model may be a template, e.g. a selected template from a template registry. The initial model may be based on a template from a template registry and subsequently edited by a user to provide the initial model. In another example, the model may be user defined by creating artefacts individually. FIG. 7*a* represents the artefact structure of an initial model, constructed based on a template model. Other than a business artefact representing an example shirt business, and an example eCommerce operation artefact, FIG. 7*a* does not give specific examples of other artefacts in the model. The various unlabeled artefacts may represent an revenue channels, roles (agent roles), metrics, websites or any other concept of the entity being modelled. The business artefact and eCommerce Operation artefact are emboldened for clarity in FIG. 7*a*.

Figure 7B:
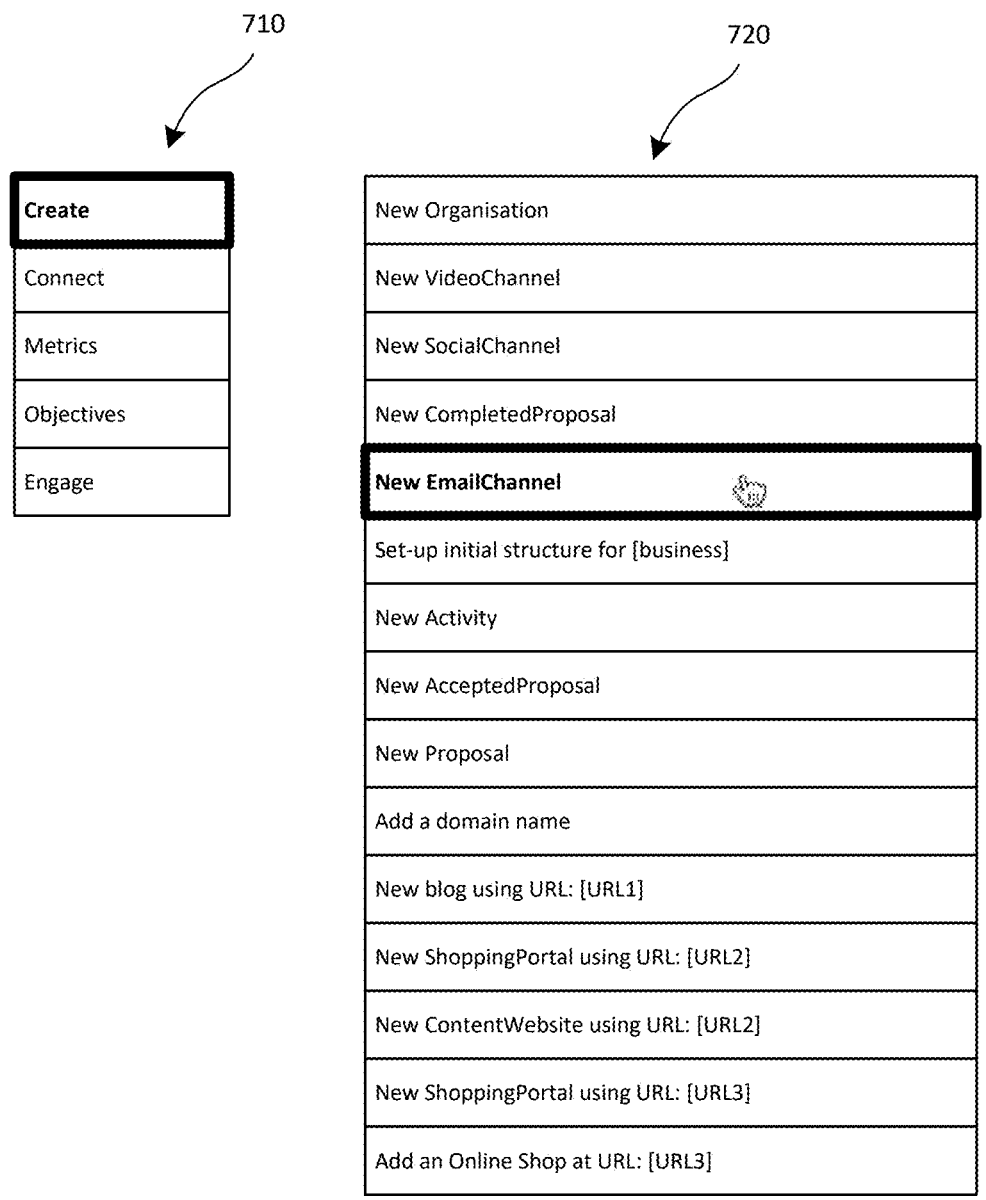
FIG. 7b shows an example user interface for selecting an artefact option to add to a model.

The runtime layer may inspect a library against the initial model to determine available options for expanding the initial model. The available options may be presented on a user interface for selection by a user. The available options may include options to run recommended agents, e.g., role artefacts. FIG. 7*b* represents an exemplary UI feature comprising a list 720 of available options for expanding the model. In FIG. 7*b*, an option bar 710 is provided for the user to navigate the user interface. A 'create' option is selected in the option bar 710, and accordingly the list 720 of available options for creating an artefact is displayed. FIG. 7*b* shows a user cursor hovering over a 'New Email Channel' option in the list 720.

Figure 7C:
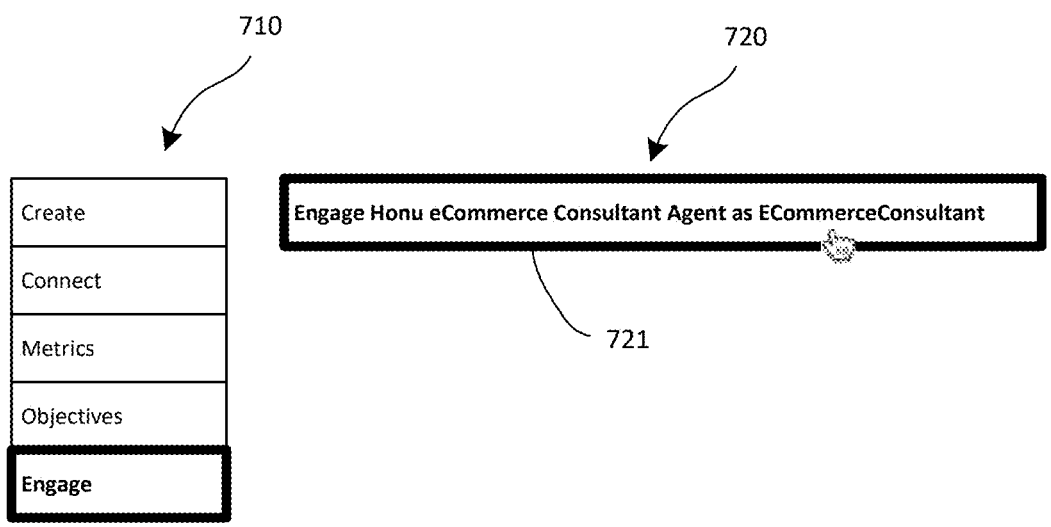
FIG. 7c shows an example user interface for selecting an agent engagement option.

FIG. 7*c* shows an example UI feature comprising an option to engage a recommendation agent, e.g., to fulfil a role represented in the model. In FIG. 7*b*, the engage tab is selected in the option bar 710, and a single engagement option 721 is presented for selection in the available selections block 720.

Figure 7D:
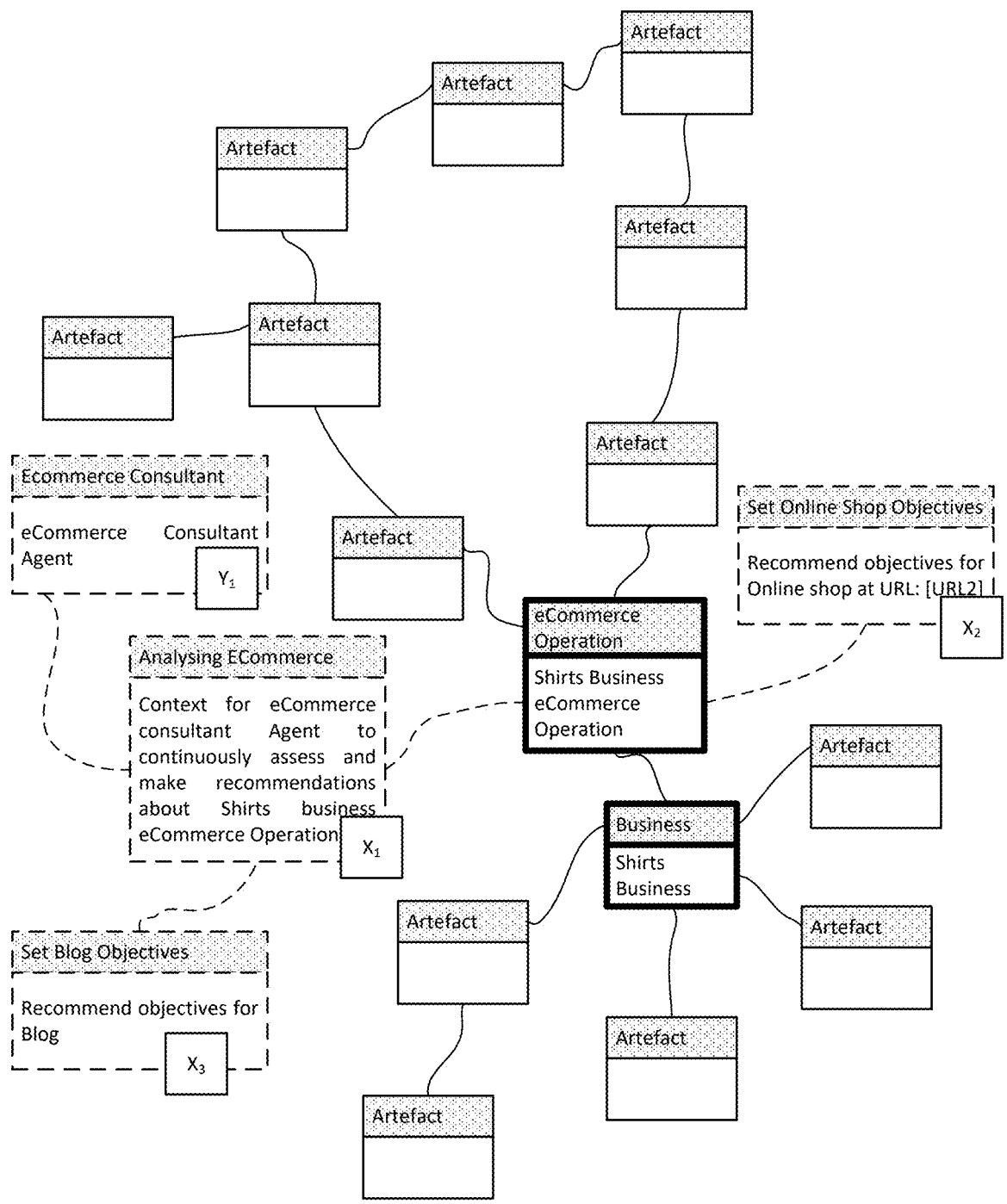
FIG. 7d shows the model of FIG. 7a, updated to include additional artefacts.

Selecting the option to engage the recommendation agent runs the recommendation agent. Running the recommendation agent causes action recommendations to be added to the model. FIG. 7*d* shows the same model as in FIG. 7*a*, wherein the model further includes a role artefact (or agent artefact) for an eCommerce consultant (artefact labelled $Y_1$) and a plurality of action recommendation artefacts (labelled $X_1, X_2, X_3$). The action recommendation artefacts and agent artefact are shown with dashed borders and with dashed links between them and other artefacts, to distinguish the model state of FIG. 7*d* from that of the initial model in FIG. 7*a*.

A recommended action may then be initiated. Initiating a recommended action comprises calling an external agent. The external agent that is called interacts with an external service, or API for an external service, via the platform hosting the model (e.g., via Honu). An automation action is performed by the interaction of the external agent with the external service.

The model is updated to include one or more artefact, indicating that the automation action has been performed.

The runtime engine then inspects the updated model against the library to update the available options.

In the above examples, a graphical user interface (GUI) is provided to visualize the entity model as it is created and updated. Whilst useful, such a GUI is not essential, and the above description pertaining to the visualization of the entity model applies more generally to the underlying model itself, whether or not the model is graphically represented.

Dynamic Context Matching

Dynamic context matching refers to a process in which the runtime engine identifies structures of artefact relationships ('contexts') in an entity model, and responsively enables behaviors to be made available and/or generates an instruction for an action to be performed (e.g., by an autonomous agent).

The inventors have built an effective mechanism for decision-making about the structure and operation of an entity such as a business, using specialized technology-based agents communicating and collaborating through a common model of the entity. The model is connected to digital services such that state, action, and feedback can be used to affect the operation and management of the entity in a wholly-automated and potentially autonomous manner. The system also provides mechanisms allowing human intervention to guide or make decisions alongside the agents.

Figure 8:
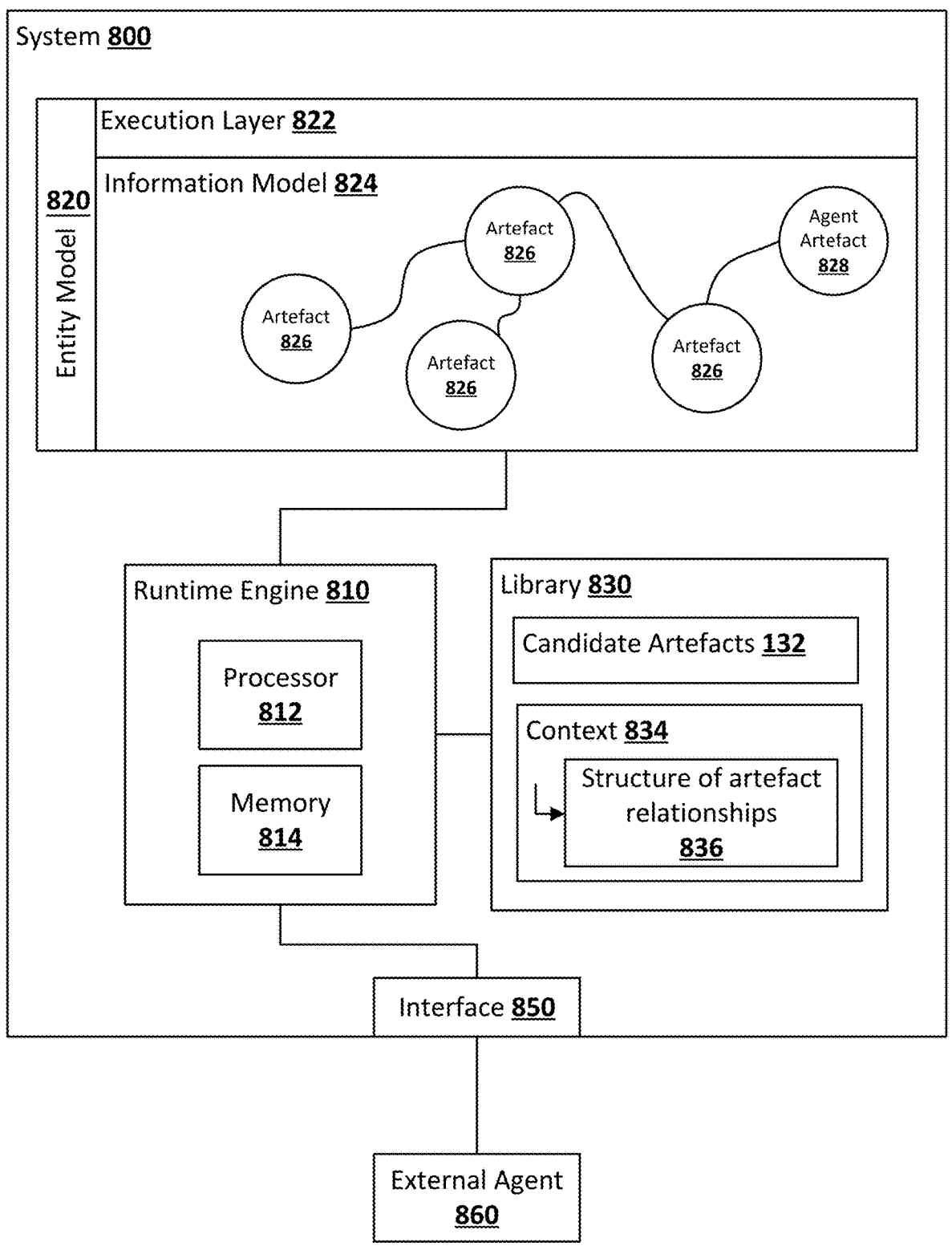
FIG. 8 shows an example system in communication with an external agent.

Reference is made to FIG. 8, which shows an example system 800 in communication with an external agent. The system is configured to enable automation of an entity such as a business, by modelling aspects of the entity and using the model to inform decisions, and identify contexts in which certain actions can potentially be automated and exploited by actants using the model.

The system 800 of FIG. 8 comprises a runtime engine 810, an entity model 820, and a library 830. The entity model 820 is dynamic and evolves to reflect real-world changes and contexts of a real-world entity being modelled. The entity model 820 encodes structural information of the entity being modelled, and further encodes processing cues for informing runtime engine actions in view of the model. The library 830 holds template or candidate model features (e.g., artefacts) which may be instantiated in the entity model when that feature becomes relevant to the real-world entity.

The runtime engine 810 is executed on one or more processor 812 coupled to computer memory 814, which holds code of the runtime engine 810 for execution. The runtime engine is configured to perform processes within the central system 800, such as inspecting entity models 820, accessing libraries 830, and transmitting instructions to external agents 860 via interfaces 850 between the system 800 and the external agents 860. Processes in the runtime engine 810 may be performed by the processor 812 based on computer-executable instructions held in the memory 814.

The entity model 820 provides an explicit model of the structure of an entity, and further provides information to inform the runtime engine of how to act based on the structures in the model. The example entity model 820 of FIG. 8 comprises an information model 824 and a communication layer 822. The information model 824 and execution layer 822 represent different aspects of the overall entity model 820. The information model 824 represents a structural model of the entity, and the execution layer 824 of the entity model 820 represents processing cues that inform the runtime engine 810 on how to interact with the model when automating actions and autonomously updating the model 820.

Instances of data structures referred to herein as 'artefacts' are provided in the entity model 820. An instance of an artefact in the model 820 may comprise structural information defining a concept in the domain of the entity being modelled, and further defining the relationship of that concept to other artefacts in the model. An instance of an artefact may also be configured as a particular 'type' of artefact. The artefact type may indicate an execution cue that informs the runtime engine 810 on how to interpret the artefact in the model. In FIG. 8, the information model 824 represents the structural information of artefact instances in the model 820. The execution layer 822 represents type information of artefact instances in the model 820, which gives execution cues to the runtime engine.

By way of example only, object-oriented programming techniques such as classes and objects may be leveraged to encode structural information in artefacts. Relationships between artefacts in the domain of an entity being modelled, as represented in the information model 824, may also be encoded based on the class structure. An artefact instance may have a particular class defining the concept it represents. Candidate artefacts in the library 830 are configured (e.g., using class structures in object-oriented programming) such that they convey structural information in the model when they are instantiated in, i.e., added to, the entity model. It will be understood, however, that the techniques described herein are not limited to a specific syntax, or indeed to an OOP-based approach (e.g., as noted, an entity model might instead be realized as a graph database or any other suitable data structure).

An artefact instance may be configured with a particular execution cue by being assigned a 'type'. In some examples, the type of each artefact may be defined using decorators, which are a feature of python code. The use of decorators enables functionality to be applied to the artefacts, without requiring the class definitions of those artefacts to be modified.

An artefact instance in the model may comprise a class object defining structural information, and may further comprise a decorated type that informs the runtime engine of how to process the artefact in the context of the model. Examples of artefact classes and types are provided later herein.

The information model 824 of FIG. 8 shows the structure of an example entity, as defined by structural information (e.g., class objects) of the artefacts in the entity model 820.

By way of example, FIG. 8 shows a plurality of artefacts 826, and an agent artefact (or role artefact) 828. Each artefact 826 represents an instance of a concept in the domain of the entity. The agent artefact 828 represents a role associated with the entity. Links between the artefacts 826 (such as memory pointers) represent structural relationships between the concepts and roles. In examples where a business is being modelled, the artefacts 826 may represent concepts related to a business domain, and the agent artefact 828 represents a role within the business, e.g., a capability to perform actions on behalf of the business. Similarly, links between artefacts in the information model 824 represent structural links between concepts in the business.

The agent artefact 828 may have a different type (e.g., different decorator) to the other artefacts 826 in the entity model 820, so that the runtime engine interprets the agent differently to other artefacts 826 which do not represent agents. However, at the information model level, it is the structure and relationship of the artefacts 826, 828 that is represented, and this structure may be encoded using instances of different classes. Information encoded by artefact types is not represented in the information model 824 of FIG. 8.

Each of the artefacts 826 may represent a different aspect of the entity being modeled. Any conceivable feature of an entity may be modelled and represented by an artefact data structure defining that feature. As discussed later herein, libraries of template artefact data structures may be compiled and may be accessible to the runtime engine 810 for inclusion in the entity model 820. For instance, when a concept for which a corresponding artefact has been defined becomes relevant to an entity being modelled, an entity model 820 for that entity may be updated to include an instance of the corresponding artefact.

The execution layer 822 augments the information model 824 with behavioral cues that tell the runtime engine how to process the information model 824. The runtime engine 810 may instruct external agents to perform actions on behalf of the entity based on the information model 824, as informed by the execution layer 822. In practice, each artefact instance in the entity model 820 may be defined with a particular class for conveying structural information, and with a type for conveying execution cues to the runtime engine.

The runtime engine 810 is shown to be connected to the entity model 820. The connection between the runtime engine 810 and the entity model 820 represents the ability of the runtime engine 810 to inspect, modify, interpret, and otherwise interact with the entity model 820. Examples of ways in which the runtime engine 810 interacts with the entity model 820 are described elsewhere herein.

The system 800 further comprises one or more library 830. The library 830 comprises a plurality of candidate artefacts 832. Candidate artefacts 832 are template artefact data structures that may be introduced to an entity model 820 (as an instance of that candidate artefact) if a concept represented by the candidate artefact 832 becomes relevant to the entity being modelled. Actions of external agents, for example, may cause a concept to become relevant to the entity being modelled, and may then be represented by a corresponding artefact instance. Various candidate artefacts 832 may be defined in a library, and the underlying template data structures may similarly vary depending on the feature the candidate artefact 832 is configured to represent.

The library 830 further defines contexts 834, which are predefined structures of artefact relationships within the entity model 820. The contexts may define states in the information model 824, and may require particular structures within the entity. The contexts may define structures of artefact relationships independently of the execution cues of each artefact. Whilst artefacts represent real-world concepts pertaining to an entity, contexts defining structures of artefacts may represent real-world situations or states of the entity.

In FIG. 8, block 834 represents a context defined in a library, and block 836 represents a corresponding predefined structure of artefact relationships. Dynamic context matching refers to a process by which the runtime engine is configured to identify predefined structures of artefacts (contexts) in the library 830, identify matching structures of artefacts in the entity model 820, and responsively update the model 820 to indicate that the model includes the corresponding context 834. That is, when the predefined structure 836 is present in the entity model 820 (e.g., as a substructure of artefacts 826, 828 in the model 820), an instance of the context 834 is added to the model. That is, the model is updated to indicate the context is present in the model.

Situations where a context 834 can be added to the entity model 820 based on a structure of attributes 836 may be captured as rules in a state machine. That is, the predefined artefact structure 836 of a context 834 may be associated with a state in the state machine, and identifying a given state may cause an update to the model 820 by the runtime engine 810, to include an instance of the context.

In response to updating the model to include an instance of the context, the runtime engine 810 may be configured to generate an instruction for an autonomous agent to perform an action.

In this way, entities can be modelled accurately, and the model can be updated autonomously as the entity evolves. Further, by enabling interface with external agents to perform real-world actions, the entity itself can be made autonomous and can perform actions based on the entity model 820, as informed by contexts 834 in the library 830.

The present disclosure provides the technical foundations for an autonomous entity to make decisions and perform actions, and to evolve and adjust the way the entity operates based on the model. Libraries 830 can inform the decision making and evolution of the autonomous entity. In the example of an entity being a business, libraries 830, candidate artefacts 832 and contexts 834 may be configured such that entity models 820 evolve according to particular business models, e.g., with particular tolerances for risk, or with a focus on particular revenue channels. Aspects of the present disclosure, however, relates to the technical foundations for enabling autonomy of entities, enabling dynamic updating of entity models and instructing agent actions by identifying contexts in models.

The entity model 820 and libraries 830 may be held in computer storage of the system 800, and the runtime engine 810 is configured to access the computer storage to access the entity model 820 and the libraries 830.

System 800 further comprises one or more interface 850. The interface may be a suitable programming interface such as an application programming interface (API) configured to enable the system to transmit instructions to external services and actors. The system 800 is configured to centrally coordinate the actions of the entity, but may interface (e.g., via interface 850) with external agents 860 to instruct the agent 860 to perform the action on behalf of the entity.

The interface 850 enables entities using it to discover what actions are possible to be applied, including adding and removing artefacts, engaging agents, making calls to configured services via proxied endpoints, and conversing with humans or agents engaged with the model.

There may be an additional administration API through which entities register and manage agents, libraries, services, and service credentials. The principle of developing API-first enables all the capabilities to be equally available to humans as to agents—this means that anything a human might do (e.g., create a library, develop an agent, register an agent, engage an agent) could also be done by an agent with sufficient permissions and abilities.

The external agent 860 may be an autonomous agent and may be configured to perform an action on behalf of the entity being modelled or engage a service on behalf of the entity being modelled. External agents may be hosted on remote servers separate from the central system 800. External agents 860 may communicate with the model via a bi-directional secure protocol implemented through language specific modules on top of a common REST API.

Particular contexts in the library may be associated with particular actions to be performed when that context is identified. The runtime engine 810 may be configured, in response to identifying a context, to cause the associated action to be performed. On identifying the context, the engine 810 may determine an action to be performed based on the context, and generate an instruction for an external agent to perform the action. The instruction may be transmitted to the external agent via an interface 850.

Figure 9:
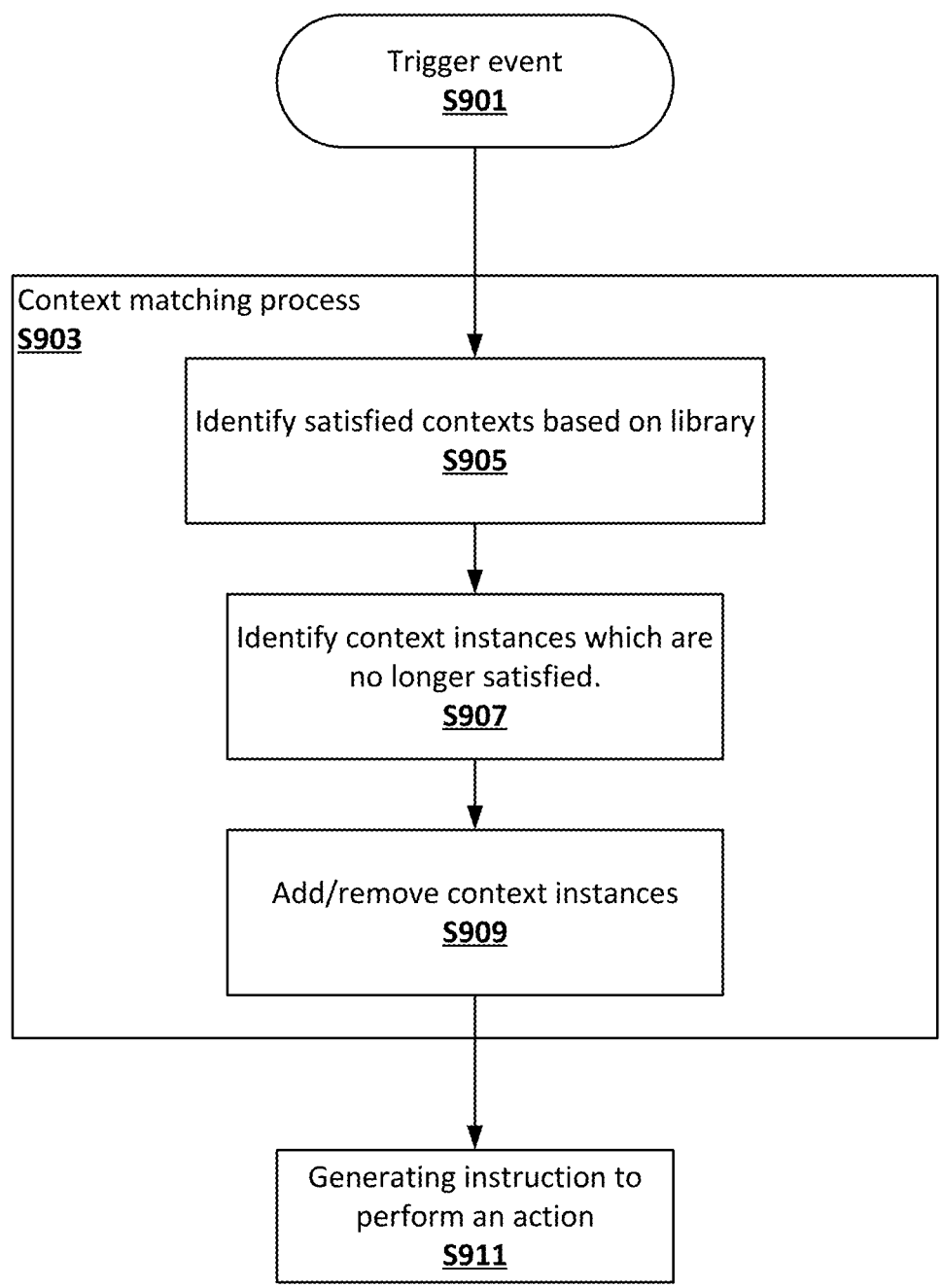
FIG. 9 shows a flowchart of an example dynamic context matching process.

FIG. 9 shows a flowchart representing an example dynamic context matching process. At a high level, the process of FIG. 9 involves the runtime engine inspecting the runtime model, assessing whether the structure of the model matches any predefined artefact structures (contexts) in the library, assessing whether any existing context instances in the model are no longer satisfied, updating the model to add and/or remove context instances, and instructing an action to be performed. For the purpose of the description herein, a 'satisfied context' refers to a predefined structure of artefacts which is exhibited in an entity model. That is, for a particular context in a library to be a satisfied context, the entity model 820 must exhibit the structure of artefact relationships defined by that context in the library. A context instance is a representation of a satisfied context in the entity model.

FIG. 9 begins at step S901, wherein a trigger event occurs. The trigger event is an event that causes the runtime engine to search a change in context within the entity model. One example of a trigger event is an update to the model. Referring to the example of FIG. 7b, such an update occurs when one of the available options 720 is selected and this selection triggers the addition, removal or modification of an artefact. This, in turn, may cause a new context to be satisfied or could mean that a context that was previously satisfies is no longer satisfied (either of which can result in a change in the set of available options). Another example of a trigger event is an update to a library, or the addition of a new library. For instance, the updated or new library may define a new context.

At a next step S903, in response to the trigger event, the runtime engine performs a dynamic context matching process. The dynamic context matching process S903 comprises assessing the structure of artefact instances in an entity model and determining, based on a library of predefined contexts, which contexts are satisfied, and which are not. The model is then updated to add context instances for satisfied contexts and to remove context instances for contexts that are no longer satisfied.

As part of the context matching step S903, the flow comprises steps S905-S909. At step S905, contexts in the library which are satisfied by the entity model are identified.

At step S907, context instances in the entity model which are no longer satisfied (because the model does not exhibit a structure of artefacts defined by the corresponding contexts in the library) are identified.

At step S909, the entity model is updated to add and remove context instances based on steps S905 and S907. The runtime engine updates the model to add context instances corresponding to contexts which are identified as being satisfied at step S905. The runtime engine removes context instances for contexts that are no longer satisfied, as identified at step S907.

At a next step S911, an instruction is generated for causing an external agent to perform an action. For example, the runtime engine may generate an instruction for an external agent to perform an action on behalf of the entity being modelled. As discussed elsewhere herein, an external agent may be engaged to perform a role for the entity, where the role may be represented by an instance of an agent artefact in the entity model.

Figure 10:
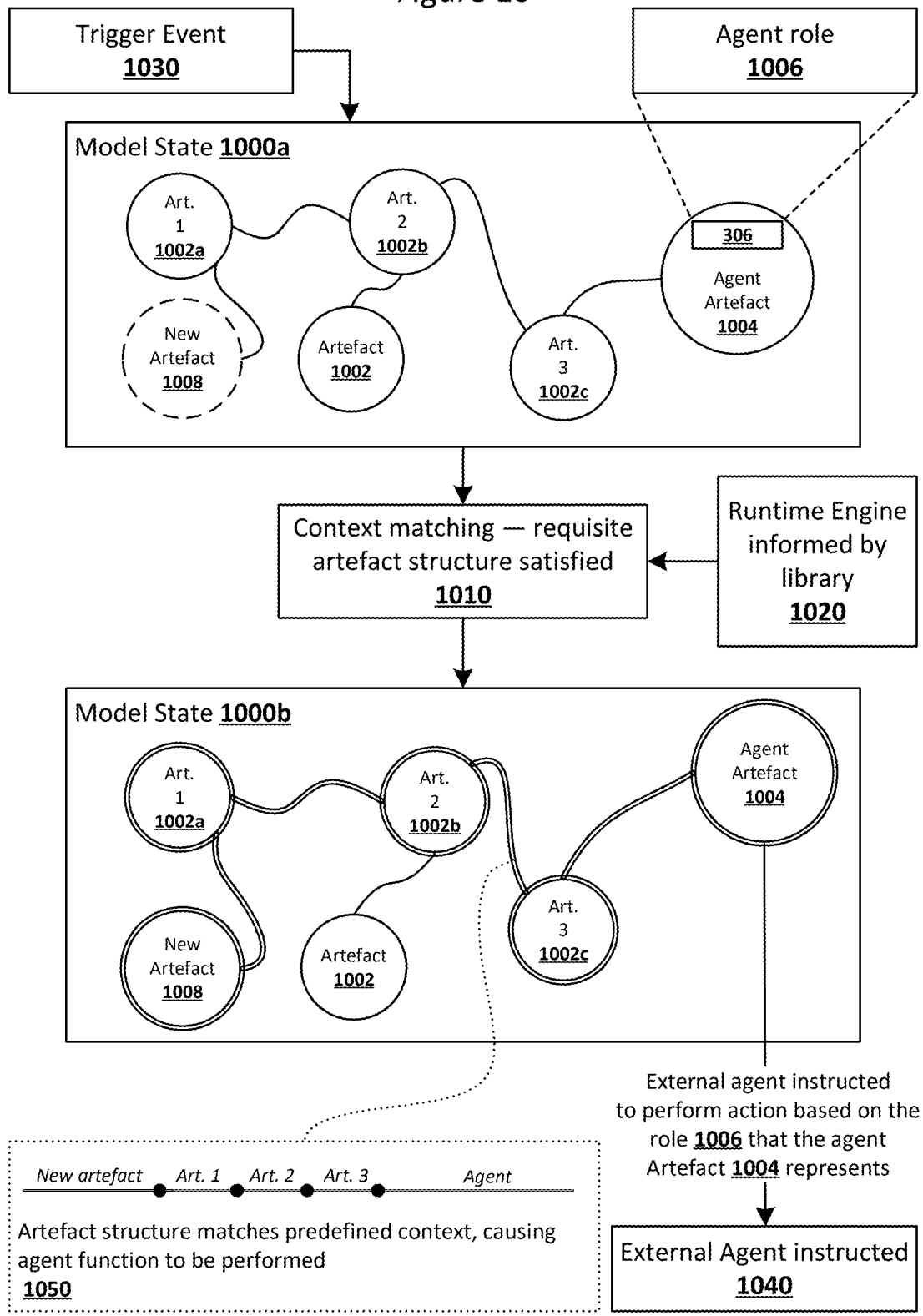
FIG. 10 shows an example entity model updating process resulting from a context matching process.

Reference is made now to FIG. 10, which shows a block diagram representing an action being instructed in response to a context matching process. FIG. 10 illustrates an example set of artefact relationships which may define a context, and shows how an action may be instructed by the runtime engine in response to identifying the context in the model.

FIG. 10 shows an example entity model in a state 1000a. It will be understood that the links between artefacts in the model represent structural relationships of the entity. The types of each artefact, which provide the execution layer 122 of an entity model, are not represented in FIG. 10.

The model, in state 1000a, comprises an agent artefact 1004, a plurality of other artefacts 1002, and a new artefact 1008. Particular reference is made to artefact 1 (1002a), artefact 2 (1002b), artefact 3 (1002c), and new artefact 1008, which are relevant later in the description of FIG. 10 when a context is identified in the model.

The agent artefact 1004 represents a role 1006, or a capability for particular actions to be carried out on behalf of the entity being modelled.

In the example of Figure, a trigger event 1030 initiates a context matching process. In FIG. 10, the trigger event comprises an update to the model to introduce a new artefact instance 1008 to the model. Model state 1000a represents the model after the trigger event, wherein the model comprises new artefact instance 1008.

Block 1010 represents a context matching process, e.g., step S903 in the example of FIG. 9. Block 1020 represents the runtime engine performing the context matching process. The runtime engine, as informed by contexts defined in the library, identifies a context which is satisfied by the model in state 1000a. The context matching process is initiated by the trigger event 1030, in which new artefact 1008 is introduced to the model.

In the example of FIG. 10, a context in the library is identified as being satisfied by the model in state 1000a. For example, by updating the model to include new artefact 1008 based on the trigger event 1030, the model now satisfies a context defined in the library. In response to identifying the satisfied context, an instance of the satisfied context is added to the model, resulting in an updated model in state 1000b.

In model state 1000b, artefacts 1-3 (1002a-c respectively), the agent artefact 1004, the new artefact 1008, and interconnections between the artefacts, are represented with double-stroke lines. The context identified as being satisfied in the dynamic context matching process 1010 has an associated structure of artefact relationships. The double stroke lines have been applied to artefacts and interconnections which exhibit this structure of artefact relationships in the model. That is, the double stroke lines in FIG. 10 represent the context instance being added to the model. The model in state 1000b includes a context instance corresponding to the satisfied context identified at block 1010.

As discussed previously, a context may be associated with an action to be performed upon identifying the context in a model. The runtime engine is configured to generate an instruction for an external agent to perform the action, in response to identifying the satisfied context. Block 1040 of FIG. 10 shows the external agent being instructed in this way.

The external agent may be engaged to perform actions via techniques described elsewhere herein. The agent artefact in the model abstractly represents a real-world role within a real-world entity that is being modelled. An external agent may be engaged to perform actions to fulfil this role in the real-world.

Block 1050 shows a simplified representation of the predefined structure of artefact relationships associated with the satisfied context in this example. The satisfied context in the example of FIG. 10 requires a structure of artefact relationships whereby the new artefact 1008 is related to artefact 1 (1002a), artefact 1 (1002a) is related to artefact 2 (1002b), artefact 2 (1002b) is related to artefact 3 (1002c), and artefact 3 (1002c) is related to the agent artefact (1004).

Examples of artefact types, i.e., components of artefacts defining execution cues for the runtime engine, are now described. The examples below are not exhaustive, and other artefact types may be configured to apply functionality to artefacts in a model.

A first example is a generic artefact type. The generic artefact type may define passive entities and concepts relevant to a problem domain. The generic artefact type may be applied to artefacts representing an organization, a business, a contract, a business proposal etc. This example list of passive concepts is non-exhaustive, and many other passive concepts in a problem domain may be provided with a generic artefact type in an entity model.

An agent type may be applied to artefacts representing roles in the entity, i.e., capabilities to perform actions. Agent type artefacts may configure the runtime engine to allow real-world external agents to be engaged to act to perform a role defined in the artefact. Engaged external agents may interface with, read, and change the structure of the model. Agent type artefacts are active elements within the model and can originate activity in the system. External agents engaged to perform the roles encapsulate domain knowledge, decision-making, and problem solving logic, and execute remotely, interfacing with the central system. An example of an agent-type artefact is a pricing agent, which may represent a role of determining prices for products sold by an entity. An external agent engaged to undertake the role of the pricing agent may, in response to instructions from the runtime engine when a relevant dynamic context is identified, adjust a price of a product on an online store, for example. The external agent may interact with the model to identify and retrieve relevant data for performing its role.

A context type defines a situation, condition, or state of the model that when satisfied enables dynamic and context-aware behavior, such as the opportunity to engage a specific external agent, retrieve data pertaining to a particular metric, or be in the position to publish a social media message.

A metric type may be applied to artefacts defining a measurable value or performance indicator of interest within the problem domain of the entity being modelled. In the context of modelling a business, examples of metrics may include revenue, number of sales, click-through rate, sale conversion rate, and other examples of measurable values.

An objective type may be applied to artefacts defining goals or desired outcomes that need to be achieved within the business to progress its state or structure. The objective type, when applied to an artefact in the model, may express the need for an external agent to be engaged to take action towards satisfying the objective. Artefacts of the objective type may be instantiated by human users or by external agents.

A context instance in a model may identify other artefacts in the model to which an objective type and an agent type have been applied. The context instance, which may dynamically be instantiated in the model based on dynamic context matching techniques described herein, thereby identifies a particular objective of the entity and a role for acting to handle that objective. External agents in the real-world are engaged to perform the role to take actions to satisfy the objective. These agent actions may be instructed by the runtime engine in response to identifying the context.

The artefacts and relationships in the information model of the entity, and the artefact types of each entity providing the execution layer, therefore enable the central system to automate real-world actions on behalf of the entity based on the contexts of the model, as well as allow external agents to update the model to reflect real-world changes to the entity.

Another example artefact type is the service type. Artefacts of the service type represent real-world services, such as online shopping platforms, analytics platforms, courier services, etc. Services can have actions invoked upon them to make changes in the real world, e.g., by instructing external agents to act to use real-world services, based on the agent and the service being represented by suitable artefacts in an entity model.

A datasource artefact type may be defined. The datasource type represents when data for a particular metric can be retrieved from a service, and what indexing and aggregation is available in the service itself.

As noted above, artefact types may be encoded using decorators in python. An artefact instance in a model may be encoded with structural information defined by the class, and the class object may be decorated with a particular type to provide the execution cues. In python, an '@' prefix is used to denote a decorator, and an artefact instance may therefore take the form:

@type
class ArtefactClass:
    #class definition

Figure 11:
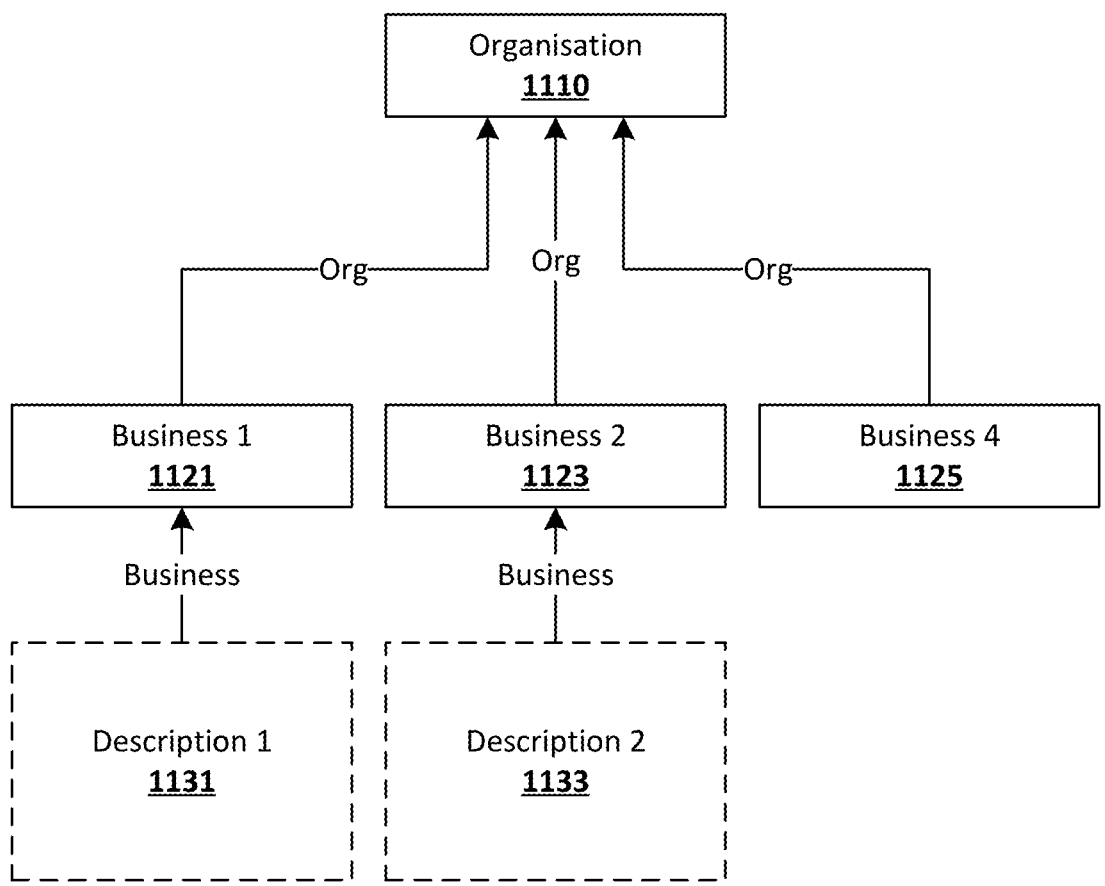
FIG. 11 shows an example model structure and associated libraries.
Figure 11:
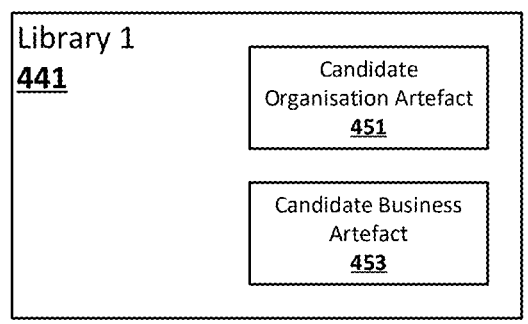
Figure 11:
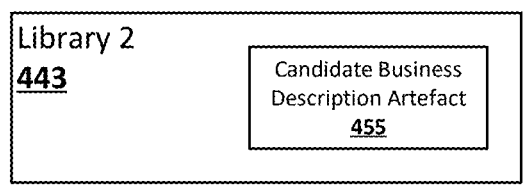

FIG. 11 shows a specific example of modelling an organization using a model of explicit artefacts which represent core concepts. FIG. 11 shows how the presently described modelling techniques are more easily extensible than other known tools, requiring no change to base definitions of candidate artefacts. In the example model of FIG. 11, a set of businesses 1121, 1123, 1125 are associated with an organization 1110, and the model is extended to provide business descriptions 1141, 1143 to some businesses within the model.

Labels on the arrows between the organization and the businesses represent artefact parameters structurally linking the businesses 1121-1125 to the organization 1110.

Template Organization 451 and Business 453 artefacts may be packaged into a first library 441. To extend the model to have descriptions attached to the Businesses, most tools would require an update to the candidate business artefact 453 definition, to add a new parameter name to the Business (e.g. description). However, a user may not have the access to change that base definition. Other tools may suggest creating a new candidate artefact which uses a sub-class of the Business (e.g. Business WithDescription). However, it is then a challenge to change all the instances to conform to this new structure.

FIG. 11 shows an alternate solution for allowing extensions to the model. A second library, Library 2 (443) is defined, and comprises a candidate business description artefact 455. Instances of the candidate business description artefact (e.g., instances 1131, 1133) may be added to the model and structurally linked to respective business artefacts, without modification to the content or structure of the business artefacts. A link between each business description artefact and its respective business artefact is stored within the business description artefact (rather than the business artefact).

As discussed above, however, behaviors and actions of external agents are not bound to artefact instances themselves, but to patterns of artefacts in the model (contexts). When library 2 (1143) is imported, it is possible to define some contextual behavior, i.e. if there is a Business (1121) with a BusinessDescription (1131) there is an action to get the text of that description. Also, if a Business 1125 doesn't have a BusinessDescription, there may be an action which returns "undescribed'.

To find out what actions are available, the model may be asked for "all actions", which dynamically changes according to the configuration and state of the model. Built into the approach is the ability to describe the artefacts and actions with parameter-based comments, meaning that it is possible to get a plain English description of the artefacts and actions available. This means that LLM-based agents might use pure natural language approaches to interacting with the model rather than using knowledge directly from knowing the library in use.

Dynamic contexts enable specialization and extension of models without having to alter artefact definitions. Dynamic context matching enables evolution of the model of a business as it grows and changes, and as new capabilities become available as third-parties develop expertise and concepts. Dynamic contexts are the elements which help model processes and practices in a business and represent the state machine of the business—but allow flexibility and extension of those processes and practices, opening them up to additional steps and skills defined in new libraries.

External agents (and optionally humans) collaboratively build the model of the business by importing libraries and invoking actions to build a shared representation of the business. It is a shared concept model about which the agents can then reason. But reasoning is not an isolated activity. Reasoning requires conversation and agreement. The explicit shared model of the business gives a strong foundation for those conversations, which may take place between two or more agents, or between agents and humans.

Whilst the entity model is the primary shared source of communication about the state and structure of the business, as previously mentioned, conversations between actants (e.g., humans and agents) may be enabled to rationalize and agree on changes to the model.

For example, a "BusinessSetUp" agent may ask a number of questions to a human to select the appropriate libraries and build the initial model. An agent might need to seek approval (@objective to approve action) for taking an action from an actant with decision responsibilities. That actant might ask for an explanation of how the requestor came to suggest the action, and might want to provide additional information to change the request (e.g., there may be a limited budget the agent hasn't taken into account)

In another example, an agent may ask a supervisory actant questions to extend the model and provide options and choices which are not yet represented in the actual state of the model (e.g. would you like to optimize for ROI or CashOnHand?).

In another example, a supervisory agent may request all engaged agents to generate proposals for improving revenue generation—this could be done with an @objective and then agents which can engage in an appropriate context with that @objective could ask additional questions to help them generate proposals. There would be one conversation with all the engaged agents meaning they are working from the same information/responses.

With the increasing sophistication of LLMs, the conversational capabilities of the model, along with the plain-English descriptions available for entities and available actions creates an opportunity for expert LLM-based agents to work with a strong model of a business and have context related conversations with other actants about the operation and structure of the business.

The REST API provides an interface for agents to initiate and participate in conversations between humans and agents. Conversations can have many participants and can be linked to a particular context (to provide a strong subject for the conversation). Conversations may be purely agent-based with no humans in the loop.

Conversations such as those in the examples above may be initiated in response to the runtime engine identifying a context in which a decision needs to be made, and responsively instructing an action to initiate the conversation.

The concept of entity mechanics is now discussed. Orthogonal to the elements which are used to model the fundamental structure of an entity and the actants, are some additional elements which define entity mechanics. Entity mechanics define functional relationships between metrics.

Entity mechanics are used when retrieving data and when forecasting or backcasting metrics. It is important that all external agents interacting with a model use the same way of calculating values, otherwise inconsistencies will occur and comparisons cannot be made independently of the agents. For example, there are several ways to calculate weekly averages: Monday-Sunday, Sunday-Saturday, or even weekdays only. These can make significant differences but even more so when thinking about accounting practices and how taxes are allocated, or cost of returns calculated. Entity mechanics being part of the shared model ensures consistency and alleviates certain responsibilities from the agent developer. The platform may provide mechanisms for calculating, solving and forecasting metrics using the mechanics.

Entity mechanics, at their most basic, are expressed as transfer functions between metrics. To take an extremely simple example, AverageSales=TotalSales/NumberOfSales.

If the model comprises respective data sources for TotalSales and NumberOfSales, the mechanic function above may be solved to calculate a historic time-series of AverageSales If the model comprises respective data sources for AverageSales and TotalSales, but not NumberOfSales, a NumberOfSales may be inferred based on the entity mechanic.

If the model comprises respective data sources for AverageSales and NumberOfSales, those data may be statistically characterized, and TotalSales may be forecasted with confidence limits for a period of time.

If the model comprises data sources for all three metrics, all expressed on a weekly basis, an agent could check to see which approach is being used to define the weekly boundaries—and may uncover that the sources are not consistent (implying action needs to be taken to resolve this or correct the data with further business mechanics).

By expressing the functional relationships between metrics explicitly in entity mechanics as first class objects, rather than simple functions, the mechanics may be shared between agents, which ensures consistency.

The combination of the model and the entity mechanics means there is sufficient information to offer full, digital-twin simulations and analysis such that "what if" experimentation can be undertaken to estimate the impacts of tactical and strategic decisions on particular entities, but also would allow agent developers to examine the behavior of their agents under a variety of model conditions.

Entity mechanics are orthogonal to the artefact model but still use the same dynamic context mechanisms to match and select which mechanics to apply. For example, if there is a single data source for Sales and it is expressed in a single currency there is one mechanic required to calculate TotalSales. However, if there is more than one source of Sales and they are in different currencies, a more sophisticated mechanic is required. This can be captured and handled through defining the mechanic with the appropriate context. In either case, an agent can deal with TotalSales as a simple concept and leave the calculations to the platform model and its mechanics.

Figure 12:
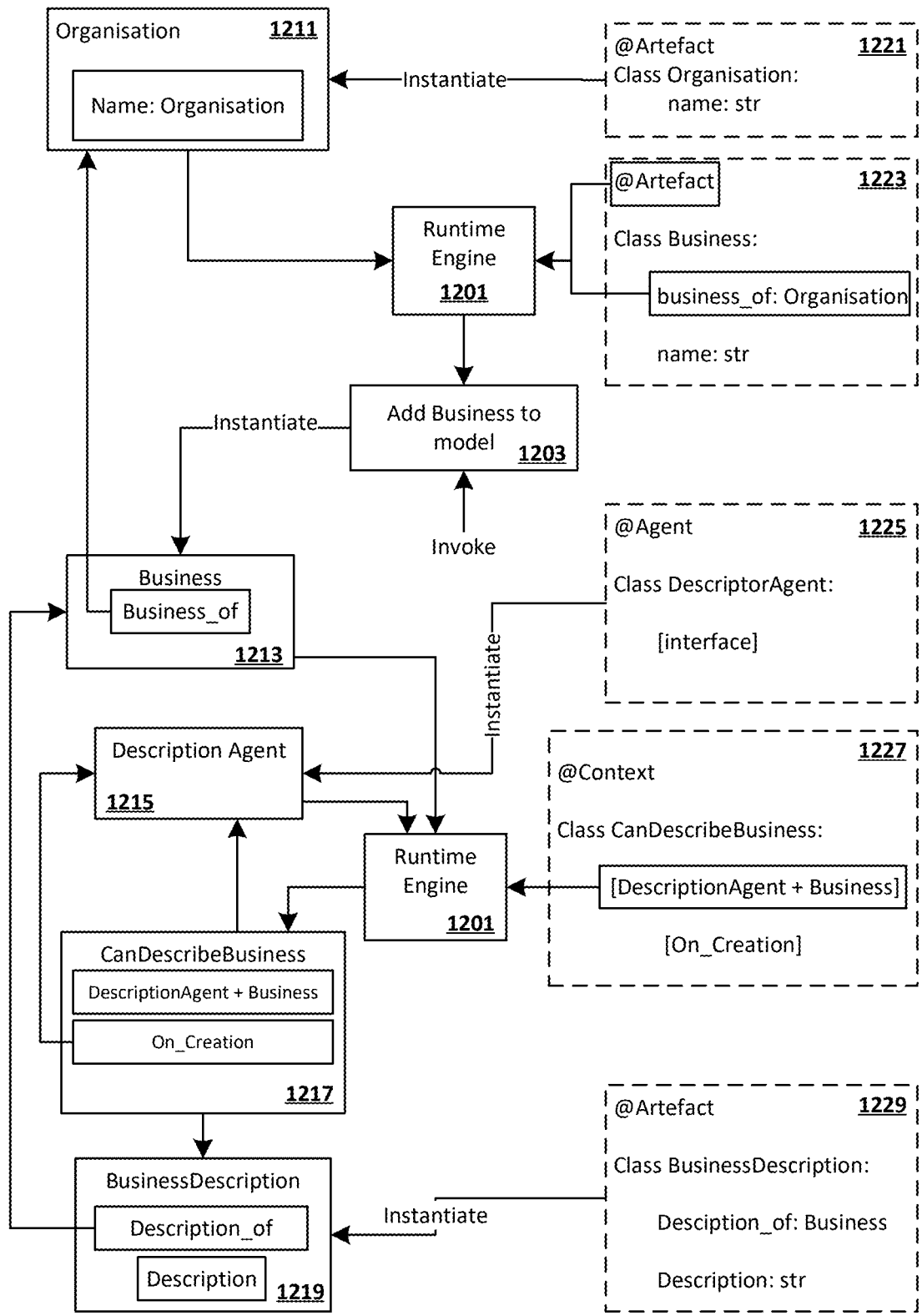
FIG. 12 illustrates an example process of instantiating artefacts in an entity model.

Reference is now made to FIG. 12, which illustrates a process of instantiating artefacts in an entity model by a runtime engine 1201. In the example of FIG. 12, class object structures and decorators in Python syntax are used to exemplify the entity modeling and context matching processes. As discussed above, however, the present disclosure is not limited to this syntax and may be implemented in other ways.

In FIG. 12, candidate artefacts 1221-1229 are represented with dashed borders on the right-hand side of FIG. 12. FIG. 12 also shows a plurality of instantiated artefacts 1211-1219.

From top to bottom, FIG. 12 represents a flow starting from an empty entity model to a model representing an organization with an associated business, where the business has an associated business description. The business description is instantiated based on a dynamic context matching process which causes a descriptive agent to be instructed to generate a description that is included in a business description artefact instantiated in the model.

A first artefact instantiated in the model is an organization artefact 1211, instantiated based on a candidate artefact 1221 packaged in a library. The candidate organization artefact 1221 includes a parameter defining a name of the organization.

When the organization artefact 1211 is instantiated in the model, a business artefact may then be instantiated, where the business artefact is structurally linked to the organization. Candidate artefact 1223 represents a business artefact, and has parameters defining an organization of which the business is a part.

Block 1203 represents the runtime engine adding a business artefact instance 1213 to the model. By instantiating the business artefact 1213 with a 'business_of' parameter value corresponding to the Organization artefact 1211, the business artefact 1213 is structurally linked to the organization artefact 1211 in the model.

A candidate agent artefact 1225 for a descriptive agent is provided in the library, and defines an interface for an external agent to provide the corresponding role. The role may be for generating a description of a business.

FIG. 12 shows a description agent artefact 1215 being instantiated in the model.

In the example of FIG. 12, a context 1227 defined in the library defines a predefined artefact structure including a DescriptionAgent artefact, and a Business artefact. That is, when a model comprises both artefacts in the predefined artefact structure of the context 1227, that context is matched. The context 1227 also defines an 'On_Creation' function which is invoked on instantiation of a corresponding context artefact 1217 in the model. In FIG. 12, the On_Creation function comprises an invocation of an external description agent to generate a description for the business, based on the interface defined in the description agent artefact 1215.

The runtime engine 1201 matches the model structure with the predefined artefact structure in the context 1228, as represented by arrows from the business artefact 1213 and description agent artefact 1215 to the runtime engine 1201. The runtime engine accordingly instantiates a context artefact 1217 in the model. The on_creation function is invoked, and the description agent generates a description.

As a result, a business description artefact 1219 is instantiated in the model, based on a candidate business description artefact 1229 in the library. The candidate business description artefact 1229 comprises parameters for defining a business which is being described (business_of), and for providing a string corresponding to the business description. The instantiated business description artefact 1219 structurally links the business description to the business artefact 1213 by way of the description_of parameter value.

Data mapping is now considered. Artefact instances in entity models represent concepts, and therefore may represent the concept of data pertaining to the entity. The artefacts may only represent the existence of relevant data though, and may not contain the data itself.

However, agents need to access and retrieve data to undertake their roles. The principle in the Data Mapping architecture is that data does not flow through the model, but is accessed directly by the agent. Furthermore, there are different modes of data retrieval depending on the scale and use of the data required.

The combination of the defined metric, service, and datasource artefact types, along with the entity mechanics, may determine the type of datasets that can be retrieved through queries. Datasets can be thought of as arrays of data with columns and row indexes described by metric-type artefacts. For example, a dataset for TotalSales by Date has a single column and a row per date.

Queries may be formulated by agents by reflecting on the metrics available in the model (e.g. TotalSales by Date between Jan. 1, 2024 and 31/12/24). Querying is a two-step process: the first step is determining what format and data access methods are available, and the second is to access and retrieve the data. This two-step process may be configured because there are a number of competing demands on accessing data.

Firstly, there is the scale of the data. If an agent wishes to retrieve a large data set for training purposes, it would be inefficient and inappropriate to stream this through a socket connection. It would be better to dump this data into a storage bucket in the cloud, and inform the agent where it was. By contrast, if the agent were only retrieving a single short time-series, returning the data as a language-specific data array might be better. This is where the first step comes into play: determining appropriate methods of access. Once selected, each method of access has its own standard way of retrieval which is the second step.

The runtime engine, which determines how to retrieve data for a particular model configuration, works with the definitions in the model and the entity mechanics in order to convert the abstract query into specific interactions with the services containing the raw data required to calculate the requested dataset. For example, accessing raw data from two separate online store services and combining the data according to an entity mechanic definitions to generate TotalSales by Date.

The majority of this work is undertaken in the processing scope of the agent. Ultimately, the data retrieval calls are routed via an API proxy running in the system, which inserts appropriate credentials and enforces data access retrieval rules.

Library Generation Though Conversation

A further concept that may be applied in the present system is that of library generation through the conversation mechanisms described above. The definitions of artefact, context, metric, and objective-type artefacts etc. are at the heart of the domain knowledge embedded in a library. These libraries are typically created by hand by humans, who express their knowledge (or others' knowledge) in stylized code such as python.

With the refinement of LLM-based techniques for code generation and generative patterns, it is possible to provide an alternate LLM-based solution for producing libraries. An agent may engage a human expert in conversation and, through a sequence of questions, generate a domain-specific library. This is has some parallels with legacy techniques of "knowledge elicitation" but with the advantage of having the ability to express a strong model in code which can then be tested.

This capability empowers non-technical experts to create libraries that can be shared and exploited by other actants without writing any code.

Automation and Entity Models

Automation in the field of artificial intelligence ('AI') has increasingly emphasized large, deep machine learning (ML) models. Much recent focus has been given to 'general' intelligent models that can perform a wide range of tasks on which they have not been explicitly trained. Such models may exhibit emerging behaviors that are hard to predict.

SUMMARY

By contrast, an extensive and modular intelligence architecture is considered herein, providing an advanced form of expert system. Specific expertise and capabilities are provided by autonomous agents in a manner that is much more tightly controlled and predictable than current large models such as large language models (LLMs). A central system coordinates sophisticated collaborative decision automation for an entity such as an organization using sophisticated and explainable entity modelling. The system is highly scalable and can accommodate entities of arbitrary complexity.

In various aspects herein, a distributed architecture comprises a central system, one or more external autonomous agents, and one or more external services. The central system interfaces with the external autonomous agents and the external services, e.g. via suitable interfaces such as programmatic interfaces or APIs. The central system stores a shared entity model which can serve as a communication model between the multiple external agents, enabling the agents to collaboratively solve problems, formulate strategies/plans, and then issue actions via the central system to external services. Inputs from external agents may be passed to the external services. Actions may originate externally to the central system. An agent may identify an action and cause a modification to the model. Based on the updated context (in view of the modification to the model), the runtime engine may inspect the context, and notify agents of the updated context such that the agent may undertake actions as part of their role.

The central system provides an interface or 'wrapper' between the agents and the services. In one example, the central systems hold a credential or set of credentials that enables it to authenticate with each external service. The agents are authenticated with the central system, and can only perform actions on the external services via the central system.

The central system contains an entity model, which is used as a basis for engaging the external agents. As actions are performed, the entity model is updated, which in turn may reveal new options for agent engagement. Thus, as the entity model is updated as actions are performed, new options for agent engagements become available, leading to further actions.

Explicit entity models are considered, which are built from defined 'artefacts'. In one example, artefacts are implemented as instances of artefact classes. In such cases, an artefact is analogous to an object in object oriented programming (OOP). An artefact class programmatically describes some aspect of an entity and, where applicable, its possible relationship(s) to other artefact(s).

One example application is process automation in an organization based on an explicit model of the organization.

An aspect herein is directed to a computer-implemented method performed in a central system, the method comprising: forming in electronic storage an initial entity model comprising a plurality of artefacts; determining, by a runtime engine, a plurality of available agent engagements (options) based on the initial entity model; responsive to an input selecting one of the available agent engagements, sending a notification to an external autonomous agent; receiving from the external autonomous agent an indication of an action to be performed, and responsive thereto: sending a message to an external service for causing the action to be performed, updating the entity model with a new artefact corresponding to the performed action; and determining a further plurality of agent actions based on the updated entity model.

The method may be repeated in an iterative fashion as actions are performed, and new agent engagements become available as the model is updated.

The initial entity model may be formed in computer memory, or in separate electronic storage.

In embodiments, each artefact may be generated as an instance of an artefact class defined in an artefact library, the plurality of available agent engagements and the further plurality of agent actions extracted from the artefact library using the initial entity model and the updated entity model respectively.

In some examples, the input selecting one of the available agent engagements may be received from a user interface based on a selection made by a human user.

In some examples, the instruction selecting one of the available agent engagements may be received from an external agent engaged to perform a role defined in an artefact of the initial model. In this manner, a first external agent that is notified of a change in the entity model can request (or suggest) engagement of a second agent.

In some examples, determining a further plurality of agent actions based on the updated entity model comprises: inspecting the updated entity model, determining that the updated entity model is in a state that satisfies a criterion defined in a library, and notifying one or more autonomous agent of the state of the entity model.

The central service may provide a registration function enabling external agents to be registered with the central system. An external agents is registered by associating a defined role with an agent identifier of the external agent. Registering a role in this manner indicates the external agent is able to fulfil that role. The plurality of available agent engagements may be determined based on a set of roles that have been associated with external agents. When an additional agents is registered with the system, the available agent engagements may be updated in response, even if the entity model has not changed at that point.

The artefact library defines possible artefact types and possible agent engagements. The library contains applicability rules, which determine when each agent engagement is available. An agent engagement becomes available when a particular type of artefact or combination of artefacts is present in the entity model. The entity model may additionally include connections (links) between artefacts representing relationships between them, and the applicability rules may depend on the artefacts and links that are present (e.g., a certain agent engagement may become available when a specific set of artefacts are connected in specific way). A set of artefacts and links therebetween, and agents engaged to perform roles defined by artefacts, and the states defined in a library may together be referred to as a 'context'. The library may define contexts (states of artefacts and links/ relationships) wherein a role becomes relevant, and an agent may be notified to undertake their role when such a context is identified in the model (e.g., through model inspection by the runtime engine).

This architecture means the library (or libraries) in the central system can be scaled in anticipation of future agent capabilities. New automation functionalities emerge dynamically as new contexts become available and/or new external agents become available, opening up new agent engagement possibilities, causing the model to grow as actions are performed.

Another aspect herein is directed to a computer-implemented method performed in a central system, the method comprising: forming in electronic storage an entity model comprising: a plurality of artefacts, each artefact being an instance of an artefact class defined in an artefact library, and one or more links between the artefacts; inspecting, by the runtime engine, the artefact library based on the entity model to determine a set of available agent engagements, the artefact library defining possible agent engagements and applicability rules pertaining thereto; responsive to an input selecting one of the available agent engagements, sending a notification to an external autonomous agent; receiving from the external autonomous agent an indication of an action to be performed, and responsive thereto, sending a message to an external service for causing the action to be performed.

The entity model may be formed in computer memory, or in separate electronic storage.

In embodiments, the artefact library may specify an agent capability for each possible agent engagement, and the central system may select the external agent by matching the external agent with the specified agent capability. This provides a modular architecture, whereby new agents with relevant capabilities may be introduced without modification to the underlying artefact library.

Embodiments of the first or second aspect may comprise the central service sending with the message with a credential (such as an authentication token or other proof of identity) for authorizing the action, the credential held in the central system in a storage location inaccessible to the external autonomous agent.

In some examples, the instruction selecting one of the available agent engagements may be received from a user interface based on a selection made by a human user. In some examples, the instruction selecting one of the available agent engagements may be received from an external agent engaged to perform a role defined in an artefact of the initial model.

The library may associate roles with contexts before agents that can fulfil those roles become available. New agent engagements may subsequently become available when an external agent registers itself for a role defined in the library that was not previously available.

Another aspect relates to a computer-implemented method performed in a central system, the method comprising:

forming in electronic storage an initial entity model comprising a plurality of artefacts;

determining, by a runtime engine, a plurality of available agent engagements based on the initial entity model;

responsive to an input selecting one of the available agent engagements, sending a notification to an external autonomous agent;

receiving from the external autonomous agent an indication of an action to be performed, and responsive thereto:

sending a message to an external service indicating the action, and thereby causing the action to be performed, updating the entity model with a new artefact corresponding to the performed action; and determining a further plurality of agent actions based on the updated entity model.

Further aspects relate to computer system programmed to implement any of the above methods, and computer-readable instructions for programming a computer system to implement the same.

The initial entity model may be formed in computer memory, or in separate electronic storage.

One of the challenges of automating entities is that entities in a given problem domain (e.g., businesses in a particular sector) appear to have similar structures but in reality the model of any particular business will be extremely specific depending upon the lifecycle phase they are in and the myriad choices of suppliers, vendors, services, practices, etc. This leads to a need to have highly customizable entity models which share as much commonality as possible such that expert agents can apply their analytical skills to specific sub-models of the business and work collaboratively with other agents towards high-level objectives. Furthermore, this demands the ability to specialize models on a per-case basis and extend the available features.

Examples herein further enable extensions and improvements contributed by third party experts to be incorporated into the platform, thus providing an adaptable technical framework for automating entities of various forms, sizes, and in various problem domains.

Examples described herein enable context-informed decision making and enable real-world actions to be performed by and on behalf of an entity. Any number of different actions may be automated, so long as an external agent configured to perform the action is available to be engaged by the central system. Advantageously, the examples herein enable automation of processes in a technical system, and the processes in the technical system are configured to cause real-world outputs and actions to be carried out.

Functional components described herein such as the runtime engine may be implemented as computer-readable instructions stored on a computer-readable medium and executed by one or more processors. The computer-readable medium may include any suitable physical device that stores data in a non-transitory manner. Examples of computer-readable media include, but are not limited to, hard disk drives, solid state drives, flash memory devices, optical discs, magnetic tapes, and the like. The computer-readable medium may also include a transitory or non-transitory signal-bearing medium that stores or transmits data, such as electrical, optical, or electromagnetic signals. The processors that execute the software instructions may be part of any suitable computing device (or system of networked devices), such as a server, a workstation, a laptop, a mobile device, or an embedded system. The processors may include general-purpose or special-purpose processors, such as central processing units (CPUs), graphics processing units (GPUs), application-specific integrated circuits (ASICs), field-programmable gate arrays (FPGAs), or any combination thereof. The processors may be configured to communicate with each other and with other components of the computing device via buses, networks, or other interfaces. Functions and operations described herein may be implemented using any such configuration of hardware.

The foregoing examples are provided for illustration purposes only and should not be construed as limiting the scope of the present disclosure. The scope is defined by the appended claims, rather than by the specific embodiments described above. Those skilled in the art will appreciate that various modifications and variations can be made to the disclosed embodiments without departing from the scope defined in the claims.

The invention claimed is:

1. A computer-implemented method of automating behaviors performed in relation to a modelled entity, comprising:
in a computer system:
accessing an entity model comprising a plurality of artefacts, each artefact modelling a feature of the modelled entity;
accessing a first predefined artefact structure associated with a first behavior, the first behavior comprising sending a message to an autonomous agent via a programming interface;
matching a first subset of one or more artefacts in the entity model with the first predefined artefact structure; and
in response to matching the first subset of one or more artefacts with the first predefined artefact structure:
initiating the first behavior associated with the first predefined artefact structure by sending the message to the autonomous agent via the programmatic interface,
receiving from the autonomous agent via the programmatic interface a response indicating an action to be performed,
causing the action to be performed, by an external service external to the computer system, by enabling interaction of the autonomous agent with the external service via the computer system, wherein the action affects the operation of the modelled entity in an automated manner; and
based on the initiated first behavior and the performed action, adding a new artefact to the entity model, or removing an existing artefact from the entity model, or modifying an existing artefact in the entity model, resulting in an updated entity model recording the action performed in the external service.

2. The method of claim 1, comprising:
accessing the updated entity model and a second predefined artefact structure associated with a second behavior;
matching a second subset of one or more artefacts in the updated entity model with the second predefined artefact structure; and
in response to matching the second subset of one or more artefacts with the second predefined artefact structure:
initiating the second behavior associated with the second predefined artefact structure, and
based on the initiated second behavior, adding a new artefact to the updated entity model, removing an existing artefact from the updated entity model, or modifying an existing artefact of the updated entity model, resulting in a second updated entity model.

3. The method of claim 1 comprising, responsive to matching the first subset of one or more artefacts with the first predefined artefact structure, associating a context artefact with the subset of one or more artefacts of the entity model.

4. The method of claim 3, wherein the first behavior is defined in a runtime engine external to the context artefact, and is identified in the runtime engine based on a type assigned to the context artefact.

5. The method of claim 3, wherein the first predefined artefact structure is defined in a context class within a library, wherein the method comprises instantiating, responsive to matching the first subset of one or more artefacts in the entity model with the first predefined artefact structure, the context class, resulting in the context artefact, the context artefact containing a link to at least one artefact of the first subset of one or more artefacts.

6. The method of claim 4, wherein each artefact of the entity model is an instance of an artefact class.

7. The method of claim 1, comprising identifying a plurality of available agent engagement behaviors based on the agent artefact in the entity model, wherein the message is sent to the autonomous agent responsive to an input selecting the first behavior from the plurality of available agent engagement behaviors.

8. The method of claim 2 comprising, in response to matching the second subset of artefacts with the second predefined artefact structure, associating a second context artefact with the second plurality of one or more artefacts.

9. The method of claim 1, wherein matching the first subset of artefacts in the entity model comprises identifying structural information of each artefact in the first subset of artefacts,
wherein each artefact of the plurality of artefacts in the entity model comprises structural information defining a feature of an entity being modelled, and defining a structural link between said artefact and one or more other artefact in the entity model.

10. The method of claim 1, wherein matching the first subset of one or more artefacts with the first predefined artefact structure is performed in response to a change in the entity model.

11. The method of claim 1, wherein matching the first subset of one or more artefacts with the first predefined artefact structure is performed in response to: a change in a library associated with the entity model, a new library being associated with the entity model, or an existing library being disassociated from the entity model.

12. The method of claim 1, wherein updating the entity model comprises adding a new artefact, wherein the new artefact contains a link to an existing artefact, wherein the existing artefact is retained in the updated entity model and does not contain any link to the new artefact.

13. A system comprising:
one or more processor; and
computer memory coupled to the one or more processor, and comprising computer executable code which, when executed by the one or more processors causes the one or more processor to:
access an entity model comprising a plurality of artefacts, each artefact modelling a feature of the modelled entity;
access a first predefined artefact structure associated with a first behavior, the first behavior comprising sending a message to an autonomous agent via a programming interface;
match a first subset of one or more artefacts in the entity model with a first predefined artefact structure; and
in response to matching the first subset of one or more artefacts with the first predefined artefact structure:
initiate the first behavior associated with the first predefined artefact structure by sending the message to the autonomous agent via the programmatic interface, receive from the autonomous agent via the programmatic interface a response indicating an action to be performed, cause the action to be performed, by an external service external to the computer system, by enabling interaction of the autonomous agent with the external service via the computer system, wherein the action affects the operation of the modelled entity in an automated manner; and based on the initiated first behavior and the performed action, add a new artefact to the entity model, or remove an existing artefact from the entity model, or modify an existing artefact in the entity model, resulting in an updated entity model recording the action performed in the external service.

14. The system of claim 13, wherein the computer executable code, when executed by the one or more processors, further causes the one or more processor to:

access the updated entity model and a second predefined artefact structure associated with a second behavior;

match a second subset of one or more artefacts in the updated entity model with the second predefined artefact structure; and in response to matching the second subset of one or more artefacts with the second predefined artefact structure:
  initiate the second behavior associated with the second predefined artefact structure, and
  based on the initiated second behavior, add a new artefact to the updated entity model, remove an existing artefact from the updated entity model, or modify an existing artefact of the updated entity model, resulting in a second updated entity model.

15. The system of claim 13, wherein the computer executable code, when executed by the one or more processors, further causes the one or more processor, responsive to matching the first subset of one or more artefacts with the first predefined artefact structure, to:

associate a context artefact with the subset of one or more artefacts of the entity model, wherein the behavior is identified based on the context artefact.

16. The system of claim 15, wherein the first behavior is defined in a runtime engine external to the context artefact, and is identified in the runtime engine based on a type assigned to the context artefact.

17. The system of claim 15, wherein the first predefined artefact structure is defined in a context class within a library, and wherein the computer executable code, when executed by the one or more processors, further causes the one or more processor to:

responsive to matching the first subset of one or more artefacts in the entity model with the first predefined artefact structure, instantiate the context class, resulting in the context artefact, the context artefact containing a link to at least one artefact of the first subset of one or more artefacts.

18. A non-transitory computer-readable medium comprising computer executable instructions which, when executed by one or more processor, cause the processor to implement a method comprising:

accessing an entity model comprising a plurality of artefacts, each artefact modelling a feature of the modelled entity;

accessing a first predefined artefact structure associated with a first behavior, the first behavior comprising sending a message to an autonomous agent via a programming interface;

matching a first subset of one or more artefacts in the entity model with the first predefined artefact structure; and in response to matching the first subset of one or more artefacts with the first predefined artefact structure:
  initiating the first behavior associated with the first predefined artefact structure by sending the message to the autonomous agent via the programmatic interface,
  receiving from the autonomous agent via the programmatic interface a response indicating an action to be performed,
  causing the action to be performed, by an external service external to the computer system, by enabling interaction of the autonomous agent with the external service via the computer system, wherein the action affects the operation of the modelled entity in an automated manner, and
  based on the initiated first behavior and the performed action, adding a new artefact to the entity model, or removing an existing artefact from the entity model, or modifying an existing artefact in the entity model, resulting in an updated entity model recording the action performed in the external service.

* * * * *